(12) United States Patent
Borsini et al.

(10) Patent No.: US 12,399,796 B2
(45) Date of Patent: Aug. 26, 2025

(54) MODULAR TEST SYSTEM

(71) Applicant: Dell Products L.P., Round Rock, TX (US)

(72) Inventors: Matthew Borsini, Northborough, MA (US); Leland W. Thompson, Tustin, CA (US); Michael Rijo, San Jose, CA (US); Samuel Hudson, Foxborough, MA (US); Robert Proulx, Holden, MA (US)

(73) Assignee: Dell Products L.P., Round Rock, TX (US)

( * ) Notice: Subject to any disclaimer, the term of this patent is extended or adjusted under 35 U.S.C. 154(b) by 642 days.

(21) Appl. No.: 17/729,052

(22) Filed: Apr. 26, 2022

(65) Prior Publication Data

US 2023/0342274 A1  Oct. 26, 2023

(51) Int. Cl.
 *G06F 11/30* (2006.01)
 *G06F 11/22* (2006.01)
 *G06F 11/263* (2006.01)
 *G06F 11/362* (2025.01)

(52) U.S. Cl.
 CPC ...... *G06F 11/3058* (2013.01); *G06F 11/2273* (2013.01); *G06F 11/263* (2013.01); *G06F 11/362* (2013.01)

(58) Field of Classification Search
 None
 See application file for complete search history.

(56) References Cited

U.S. PATENT DOCUMENTS

| | | | |
|---|---|---|---|
| 2006/0123280 A1* | 6/2006 | Tran | G11C 29/50004 714/718 |
| 2013/0111505 A1* | 5/2013 | Frick | G06F 11/263 719/328 |
| 2014/0208082 A1* | 7/2014 | Fritzsche | G06F 11/2294 712/227 |
| 2014/0208161 A1* | 7/2014 | Fritzsche | G06F 11/273 714/30 |
| 2015/0243370 A1* | 8/2015 | Zhang | G11C 29/56008 714/718 |
| 2019/0066815 A1* | 2/2019 | Chiu | G01R 31/2884 |
| 2020/0411129 A1* | 12/2020 | Vigilante | G11C 29/36 |
| 2021/0148964 A1* | 5/2021 | Sun | G01R 31/2834 |
| 2022/0253395 A1* | 8/2022 | Nguyen | G06F 13/409 |

* cited by examiner

*Primary Examiner* — Lina Cordero
(74) *Attorney, Agent, or Firm* — Joseph Mencher

(57) ABSTRACT

A modular test system includes a modular controller subsystem coupled to a modular tested subsystem by a modular intermediary subsystem. The modular intermediary subsystem transmits communications between the modular controller subsystem and the modular tested subsystem during testing operations performed by the modular controller subsystem, and performs at least one testing function that is not available in the modular controller subsystem during the testing operations performed by the modular controller subsystem.

20 Claims, 16 Drawing Sheets

MODULAR TEST SYSTEM

BACKGROUND

The present disclosure relates generally to information handling systems, and more particularly to a modular test system for testing subsystems utilized in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, networking devices (e.g., switch devices), storage systems, desktop computing devices, laptop/notebook computing devices, tablet computing devices, mobile phones, and/or other computing devices known in the art, often include subsystems that are tested during their development and/or otherwise prior to being provided in those computing devices. For example, storage devices such as Solid State Drive (SSD) storage devices including NAND storage subsystems provide just one example of subsystems that may be included in such computing devices and subject of the testing described below. The testing of subsystems in computing devices such as Integrated Circuit (IC) components like the NAND storage subsystems/storage media discussed above may include the testing of a variety of different storage media usages and functions. In specific examples, high-speed data transmission testing that utilizes relatively complex command sets with relatively intricate timing requirements may be performed on the storage media, power consumption testing may be performed for any of a variety of operations associated with the storage media, temperature-dependent behavior testing may be performed to measure the behavior of the storage media at different temperatures, and data retention testing may be performed to determine data retention capabilities under different usage and temperature conditions. As will be appreciated by one of skill in the art, significant variation in the result of such testing may exist between different storage media (e.g., across different NAND technology generations, manufacturers, etc.).

One of skill in the art will appreciate how the different testing described above requires physically different measurement systems and pathways. For example, for the high-speed data transmission testing described above, it is desirable to provide high-speed data connections on a controller that connect to the storage media in order to test maximum speed capabilities, efficiently execute test instructions, and/or accomplish other high-speed testing objectives that would be apparent to one of skill in the art. However, in other examples, it may be desirable to provide debug ports coupled to a communication bus on the controller that connects the controller to the storage media in order to allow for the analysis of commands and data exchanged with the storage media, and one of skill in the art in possession of the present disclosure will appreciate how such debug ports would interfere with the high-speed data transmission testing described above, thus requiring different controllers with different configurations (e.g., different controller paths, different signal turning parameters, etc.) in order to perform the high-speed data transmission testing and the debug testing discussed above.

Furthermore, some conventional storage media testing techniques utilize actual SSD storage devices or SSD-storage-device-like configurations that may include the storage media under test (e.g., providing NAND storage systems in an existing storage device/storage device chassis or on a chassis having an existing storage device configuration), and that may be connected to an SSD controller IC or Field Programmable Gate Array (FPGA)-type controller that is configured to test different characteristics of that storage media. Further still, in some situations, "test couplings" (e.g., test probes) may be provided in the storage device or storage-device-like configuration to capture particular data (e.g., voltage data, current data, etc.), perform data analysis (e.g., debug data analysis), and/or other testing operations that would be apparent to one of skill in the art. As such, based on the type of testing being conducted, conventional storage media testing systems may provide either or both of the controller and storage media/storage device with a particular configuration or design that includes the features needed to perform that type of testing.

As will be appreciated by one of skill in the art, the conventional storage media test systems discussed above, and the associated time to perform such testing, is relatively expensive, as each physical configuration or design (e.g., to perform high speed data transmission testing, debug operations, power measurement, etc.) requires particular resources and resource configurations to accomplish the associated testing objectives. Furthermore, controlling circuitry and storage media generations may evolve out of phase with each other, and the storage-media-specific configuration/design of conventional storage media testing systems requires newly configured/designed storage media testing systems when new storage media is developed.

Accordingly, it would be desirable to provide a test system that addresses the issues discussed above.

SUMMARY

According to one embodiment, a modular intermediary subsystem includes a modular intermediary board; a first modular intermediary connector that is included on the modular intermediary board and that is configured to connect to a modular controller subsystem; a second modular intermediary connector that is included on the modular intermediary board and that is configured to connect to a modular tested subsystem; a first modular intermediary board subsystem that is included on the modular intermediary board and that is configured to: transmit communications between the modular controller subsystem and the modular tested subsystem during testing operations performed by the modular controller subsystem; and a second modular intermediary board subsystem that is included on the modular intermediary board and that is configured to: perform at least one testing function that is not available in the modular controller subsystem during the testing operations performed by the modular controller subsystem.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
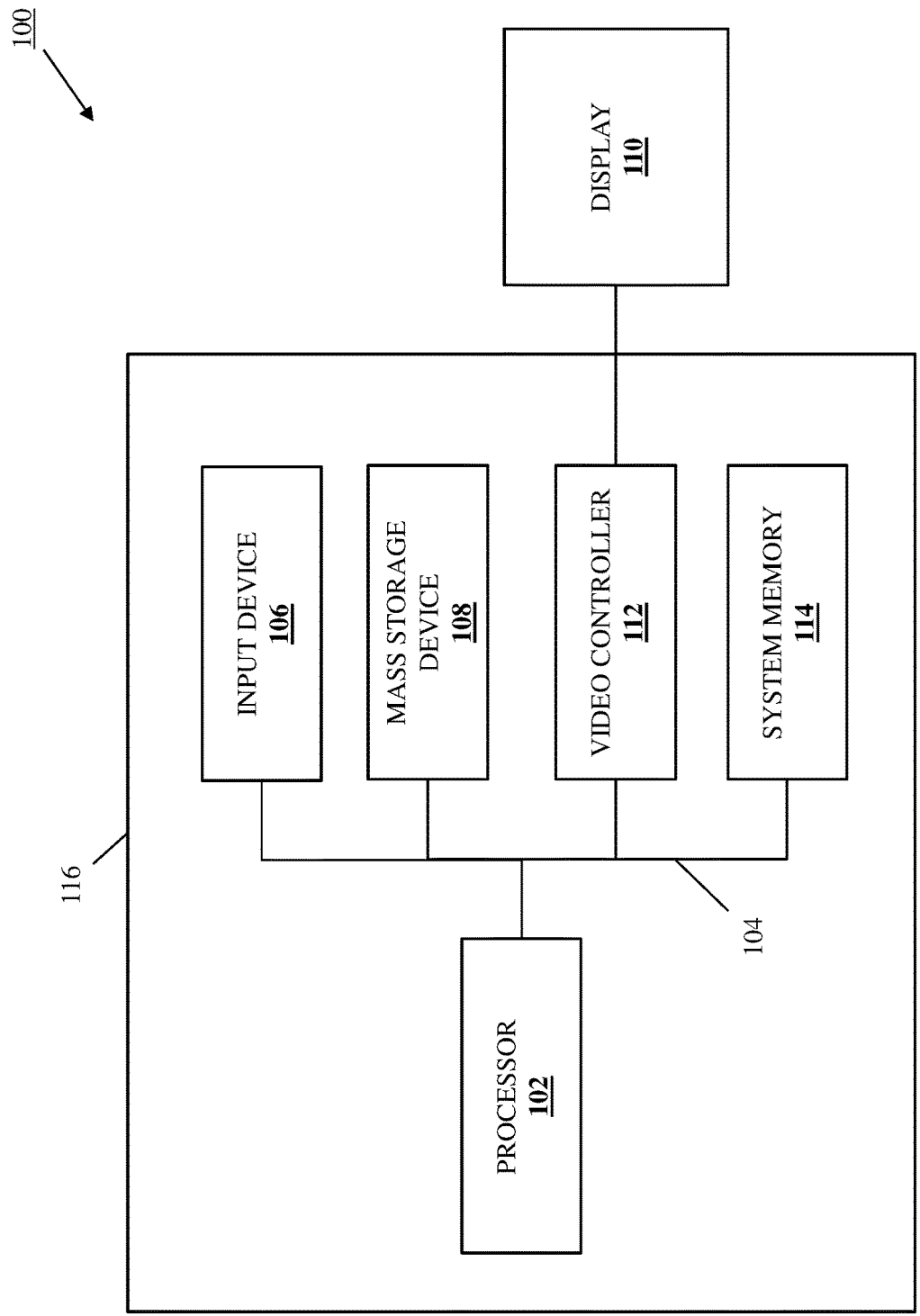
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
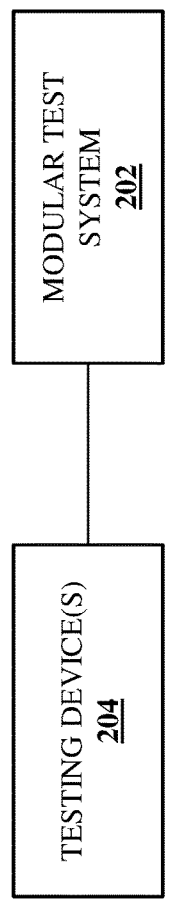
FIG. 2 is a schematic view illustrating an embodiment of a modular test system provided according to the teachings of the present disclosure and coupled to one or more testing devices.

Referring now to FIG. 2, an embodiment of a testing system 200 is illustrated. In the illustrated embodiment, the testing system 200 includes a modular test system 202 that is provided according to the teachings of the present disclosure, and that is discussed in further detail below. The modular test system 202 is coupled to one or more testing device(s) 204. In an embodiment, any of the test device(s) 204 may be provided by the IHS 100 discussed above with reference to FIG. 1, and/or may include some or all of the components of the IHS 100, and in the specific examples provided herein are described as desktop computing devices, laptop/notebook computing devices, power management data analysis computing devices, and debug data analysis computing devices. However, while illustrated and discussed as being provided by particular computing devices, one of skill in the art in possession of the present disclosure will recognize that test devices provided in the testing system 200 may include any devices or systems (e.g., a temperature-controlled environment system that may perform the storage media "baking" operations described below) that may be configured to perform the testing discussed below. However, while a specific testing system 200 has been illustrated and described, one of skill in the art in possession of the present disclosure will recognize that the modular test system of the present disclosure may be used in variety of testing systems while remaining within the scope of the present disclosure as well.

Figure 3:
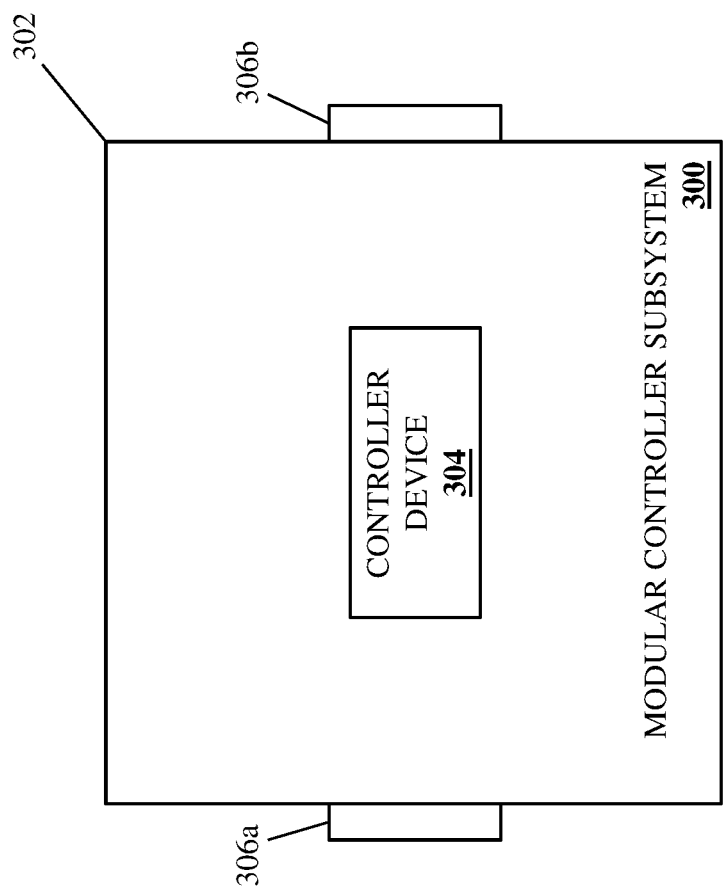
FIG. 3 is a schematic view illustrating an embodiment of a modular controller subsystem that may be included in the modular testing system of FIG. 2.

Referring now to FIG. 3, an embodiment of a modular controller subsystem 300 is illustrated that may be included in the modular test system 202 discussed above with reference to FIG. 2. In the illustrated embodiment, the modular controller subsystem 300 includes a chassis 302 that supports the components of the modular controller subsystem 300, only some of which are illustrated and discussed below. For example, the chassis 302 may be provided by a circuit board 302, although other chassis are envisioned as falling within the scope of the present disclosure as well. A controller device 304 is mounted to the chassis 302 and, in some examples, may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a controller engine that is configured to perform the functionality of the controller engines and/or controller devices discussed below.

A plurality of connectors 306a and 306b are included on the chassis 302, and one of skill in the art in possession of the present disclosure will appreciate how the connectors 306a and 306b may be coupled to the controller device 304 via the chassis 302. For example, in embodiments in which the chassis 302 is a circuit board, that circuit board may include traces, wiring, couplings, and/or other circuit board subsystems that couple the connectors 306a and 306b to the controller device 304. However, while a specific modular controller subsystem 300 has been illustrated and described, one of skill in the art in possession of the present disclosure will recognize that modular controller subsystems (or other devices operating according to the teachings of the present disclosure in a manner similar to that described below for the modular controller subsystem) may include a variety of components and/or component configurations for providing the functionality discussed below while remaining within the scope of the present disclosure as well.

Figure 4:
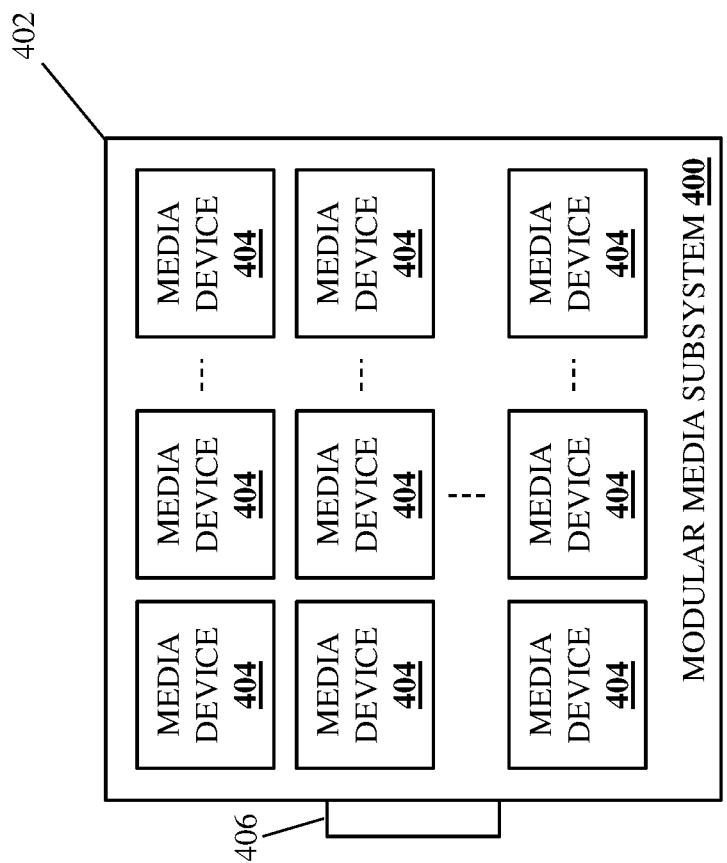
FIG. 4 is a schematic view illustrating an embodiment of a modular tested subsystem provided by a modular media subsystem that may be included in the modular test system of FIG. 2.

Referring now to FIG. 4, an embodiment of a modular tested subsystem provided by a modular media subsystem 400 is illustrated that may be included in the modular test system 202 discussed above with reference to FIG. 2. In the illustrated embodiment, the modular media subsystem 400 includes a chassis 402 that supports the components of the modular media subsystem 400, only some of which are illustrated and discussed below. For example, the chassis 402 may be provided by a circuit board, although other chassis are envisioned as falling within the scope of the present disclosure as well. A plurality of media devices 404 are mounted to the chassis 402 and, in some examples, may be provided by storage media such as NAND storage subsystems. However, while a particular modular tested subsystem including particular tested devices (e.g., storage media devices provided by NAND storage subsystems in the illustrated examples) is provided, one of skill in the art in possession of the present disclosure will recognize how a variety of modular tested subsystems may provide different tested devices for testing according to the teachings of the present disclosure while remaining within its scope as well.

A connector 406 is included on the chassis 402, and one of skill in the art in possession of the present disclosure will appreciate how the connector 406 may be coupled to the media devices 404 via the chassis 402. For example, in embodiments in which the chassis 402 is a circuit board, that circuit board may include traces, wiring, couplings, and/or other circuit board subsystems that couple the connector 406 to the media devices 404. However, while a specific modular tested subsystem provided by a modular media subsystem 400 has been illustrated and described, one of skill in the art in possession of the present disclosure will recognize that modular tested subsystems (or other devices operating according to the teachings of the present disclosure in a manner similar to that described below for the modular media subsystem 400) may include a variety of components and/or component configurations for providing the functionality discussed below while remaining within the scope of the present disclosure as well.

Figure 5:
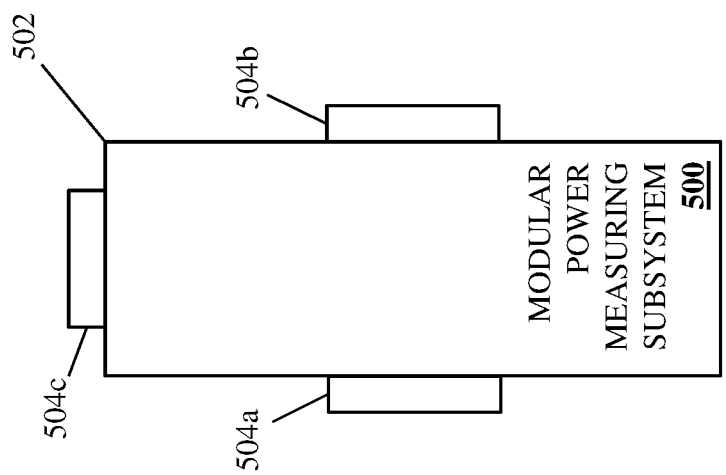
FIG. 5 is a schematic view illustrating an embodiment of a modular intermediary subsystem provided by a modular power measuring subsystem that may be included in the modular test system of FIG. 2.

Referring now to FIG. 5, an embodiment of a modular intermediary subsystem provided by a modular power measuring subsystem 500 is illustrated that may be included in the modular test system 202 discussed above with reference to FIG. 2. In the illustrated embodiment, the modular power measuring subsystem 500 includes a chassis 502 that supports the components of the modular power measuring subsystem 500, only some of which are illustrated and discussed below. For example, the chassis 502 may be provided by a circuit board, although other chassis are envisioned as falling within the scope of the present disclosure as well. A plurality of connectors 504a, 504b, and 504c are included on the chassis 502, and one of skill in the art in possession of the present disclosure will appreciate how the connectors 504a, 504b, and 504c may be coupled to each other via the chassis 502. For example, in embodiments in which the chassis 502 is a circuit board, that circuit board may include traces, wiring, couplings, and/or other circuit board subsystems that couple the connectors 504a, 504b, and 504c to each other.

In the specific examples described below, the chassis 502/circuit board includes a first modular intermediary board subsystem that may be provided by circuitry (e.g., the traces, wiring, couplings, etc. discussed above) that is configured to transmit communications between the connectors 504a and 504b during testing operations. Furthermore, in some embodiments, the chassis 502/circuit board may include a second modular intermediary board subsystem that may be provided by circuitry (e.g., the traces, wiring, couplings, etc. discussed above) that is configured to transmit data received at the connector 504b to the connector 504c. Furthermore, in some embodiments, the chassis 502/circuit board may include a second modular intermediary board subsystem that may be configured to provide processing functionality that performs a power measurement function on data received via the connector 504b, and generates power measurement data that it transmits via the connector 504a.

As such, while not explicitly illustrated in FIG. 5, in some embodiments the chassis 502 may support a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a power measuring engine that is configured to perform the functionality of the power measuring engines and/or modular power measuring subsystems discussed below, and that one of skill in the art in possession of the present disclosure will appreciate may be coupled to any or all of the connectors 504a-504c. However, while a specific modular power measuring subsystem 500 has been illustrated and described, one of skill in the art in possession of the present disclosure will recognize that modular intermediary subsystems (or other devices operating according to the teachings of the present disclosure in a manner similar to that described below for the modular power measuring subsystem 500) may include a variety of components and/or component configurations for providing the functionality discussed below while remaining within the scope of the present disclosure as well.

Figure 6:
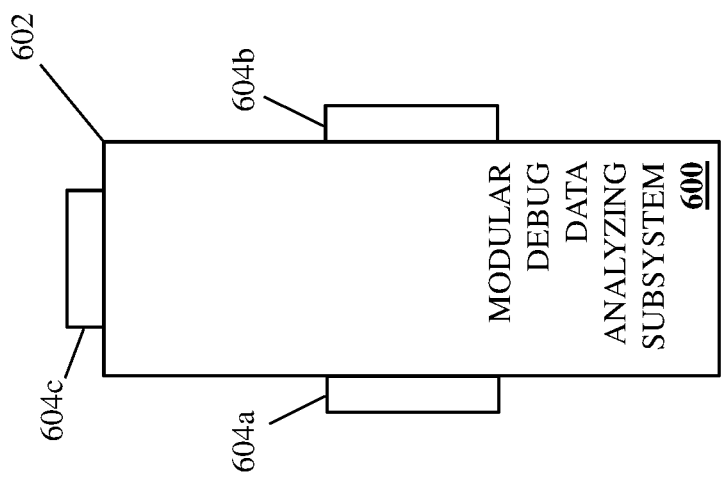
FIG. 6 is a schematic view illustrating an embodiment of a modular intermediary subsystem provided by a modular debug data analyzing subsystem that may be included in the modular test system of FIG. 2.

Referring now to FIG. 6, an embodiment of a modular intermediary subsystem provided by a modular debug data analyzing subsystem 600 is illustrated that may be included in the modular test system 202 discussed above with reference to FIG. 2. In the illustrated embodiment, the modular debug data analyzing subsystem 600 includes a chassis 602 that supports the components of the modular debug data analyzing subsystem 600, only some of which are illustrated and discussed below. For example, the chassis 602 may be provided by a circuit board, although other chassis are envisioned as falling within the scope of the present disclosure as well. A plurality of connectors 604a, 604b, and 604c are included on the chassis 602, and one of skill in the art in possession of the present disclosure will appreciate how the connectors 604a, 604b, and 604c may be coupled to each other via the chassis 602. For example, in embodiments in which the chassis 602 is a circuit board, that circuit board may include traces, wiring, couplings, and/or other circuit board subsystems that couple the connectors 604a, 604b, and 604c to each other.

In the specific examples described below, the chassis 602/circuit board includes a first modular intermediary board subsystem that may be provided by circuitry (e.g., the traces, wiring, couplings, etc. discussed above) that is configured to transmit communications between the connectors 604a and 604b during testing operations. Furthermore, in some embodiments, the chassis 602/circuit board may include a second modular intermediary board subsystem that may be provided by circuitry (e.g., the traces, wiring, couplings, etc. discussed above) that is configured to transmit data received at the connector 604b to the connector 604c. Furthermore, in some embodiments, the chassis 602/circuit board may include a second modular intermediary board subsystem that may be configured to provide processing functionality that performs a debug data analyzing function on data received via the connector 604b, and generates debug data that it transmits via the connector 604a.

As such, while not explicitly illustrated in FIG. 6, in some embodiments the chassis 602 may support a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a debug data analyzing engine that is configured to perform the functionality of the debug data analyzing engines and/or modular debug data analyzing subsystems discussed below, and that one of skill in the art in possession of the present disclosure will appreciate may be coupled to any or all of the connectors 604a-604c. However, while a specific modular debug data analyzing subsystem 600 has been illustrated and described, one of skill in the art in possession of the present disclosure will recognize that modular intermediary subsystems (or other devices operating according to the teachings of the present disclosure in a manner similar to that described below for the modular debug data analyzing subsystem 600) may include a variety of components and/or component configurations for providing the functionality discussed below while remaining within the scope of the present disclosure as well.

Figure 7:
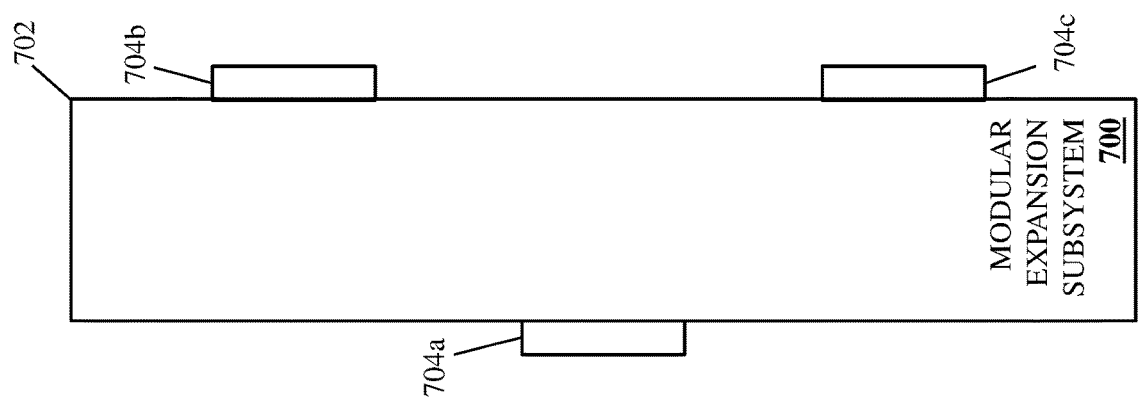
FIG. 7 is a schematic view illustrating an embodiment of a modular intermediary subsystem provided by a modular expansion subsystem that may be included in the modular test system of FIG. 2.

Referring now to FIG. 7, an embodiment of a modular intermediary subsystem provided by a modular expansion subsystem 700 is illustrated that may be included in the modular test system 202 discussed above with reference to FIG. 2. In the illustrated embodiment, the modular expansion subsystem 700 includes a chassis 702 that supports the components of the modular expansion subsystem 700, only some of which are illustrated and discussed below. For example, the chassis 702 may be provided by a circuit board, although other chassis are envisioned as falling within the scope of the present disclosure as well. A plurality of connectors 704a, 704b, and 704c are included on the chassis 702, and one of skill in the art in possession of the present disclosure will appreciate how the connectors 704a, 704b, and 704c may be coupled to each other via the chassis 702. For example, in embodiments in which the chassis 702 is a circuit board, that circuit board may include traces, wiring, couplings, and/or other circuit board subsystems that couple the connectors 704a, 704b, and 704c to each other.

In the specific examples described below, the chassis 702/circuit board includes a first modular intermediary board subsystem that may be provided by circuitry (e.g., the traces, wiring, couplings, etc. discussed above) that is configured to transmit communications between the connector 704a and the connectors 704b and 704c during testing operations. Furthermore, in some embodiments, the chassis 702/circuit board may include a second modular intermediary board subsystem that may be configured to provide processing functionality that performs expansion data routing functions on data transmitted between any of the connectors 704a, 704b, and/or 704c.

As such, while not explicitly illustrated in FIG. 7, in some embodiments the chassis 702 may support a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an expansion data routing engine that is configured to perform the functionality of the expansion data routing engines and/or modular expansion subsystems discussed below, and that one of skill in the art in possession of the present disclosure will appreciate may be coupled to any or all of the connectors 704a-704c. However, while a specific modular expansion subsystem 700 has been illustrated and described, one of skill in the art in possession of the present disclosure will recognize that modular intermediary subsystems (or other devices operating according to the teachings of the present disclosure in a manner similar to that described below for the modular expansion subsystem 700) may include a variety of components and/or component configurations for providing the functionality discussed below while remaining within the scope of the present disclosure as well.

Figure 8:
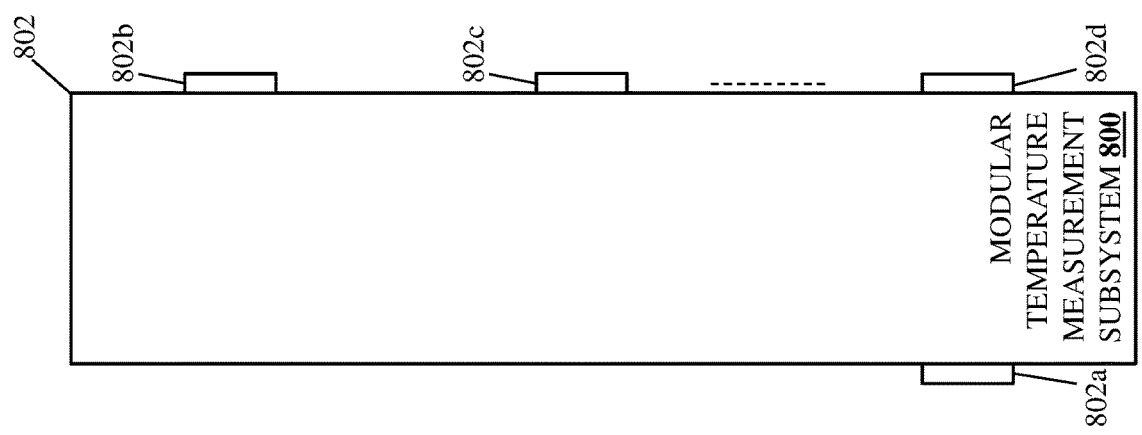
FIG. 8 is a schematic view illustrating an embodiment of a modular temperature measurement subsystem that may be included in the modular test system of FIG. 2.

Referring now to FIG. 8, an embodiment of a modular intermediary subsystem provided by a modular temperature measurement subsystem 800 is illustrated that may be included in the modular test system 202 discussed above with reference to FIG. 2. In the illustrated embodiment, the modular temperature measurement subsystem 800 includes a chassis 802 that supports the components of the modular temperature measurement subsystem 800, only some of which are illustrated and discussed below. For example, the chassis 802 may be provided by a circuit board, although other chassis are envisioned as falling within the scope of the present disclosure as well. A plurality of connectors 802a, 802b, 802c, and up to 802d are included on the chassis 802, and one of skill in the art in possession of the present disclosure will appreciate how the connector 802a and the connectors 802b-802d may be coupled to each other via the chassis 802. For example, in embodiments in which the chassis 802 is a circuit board, that circuit board may include traces, wiring, couplings, and/or other circuit board subsystems that couple the connector 802a to the connectors 802b-802d. However, while a specific modular temperature measurement subsystem 800 has been illustrated and described, one of skill in the art in possession of the present disclosure will recognize that modular intermediary subsystems (or other devices operating according to the teachings of the present disclosure in a manner similar to that described below for the modular temperature measurement subsystem 800) may include a variety of components and/or component configurations for providing the functionality discussed below while remaining within the scope of the present disclosure as well.

Figure 9:
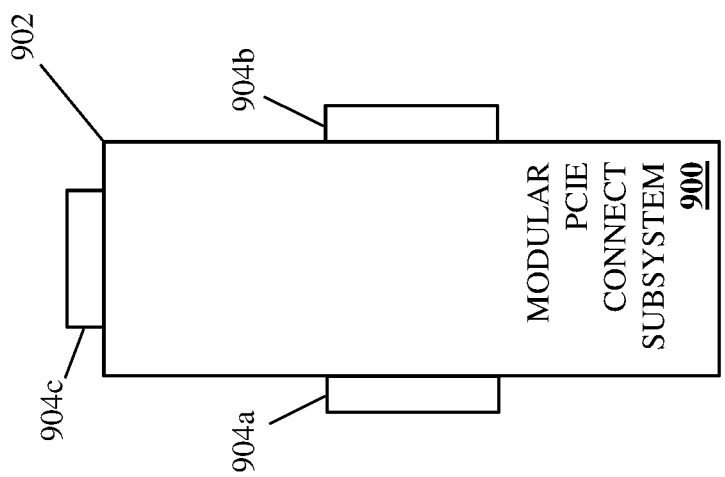
FIG. 9 is a schematic view illustrating an embodiment of a modular intermediary subsystem provided by a modular PCIe connect subsystem that may be included in the modular test system of FIG. 2.

Referring now to FIG. 9, an embodiment of a modular intermediary subsystem provided by a modular Peripheral Component Interconnect express (PCIe) connect subsystem 900 is illustrated that may be included in the modular test system 202 discussed above with reference to FIG. 2. In the illustrated embodiment, the modular PCIe connect subsystem 900 includes a chassis 902 that supports the components of the modular PCIe connect subsystem 900, only some of which are illustrated and discussed below. For example, the chassis 902 may be provided by a circuit board, although other chassis are envisioned as falling within the scope of the present disclosure as well. A plurality of connectors 904a, 904b, and 904c are included on the chassis 902, and one of skill in the art in possession of the present disclosure will appreciate how the connectors 904a, 904b, and 904c may be coupled to each other via the chassis 902. For example, in embodiments in which the chassis 902 is a circuit board, that circuit board may include traces, wiring, couplings, and/or other circuit board subsystems that couple the connectors 904a, 904b, and 904c to each other.

In the specific examples described below, the chassis 902/circuit board includes a first modular intermediary board subsystem that may be provided by circuitry (e.g., the traces, wiring, couplings, etc. discussed above) that is configured to transmit communications between any of the connectors 904a, 904b, and 904c during testing operations. Furthermore, in some embodiments, the chassis 902/circuit board may include a second modular intermediary board subsystem that may be configured to provide processing functionality that performs PCIe data routing functions on data transmitted between any of the connectors 904a, 904b, and/or 904c.

As such, while not explicitly illustrated in FIG. 9, in some embodiments the chassis 902 may support a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a PCIe data routing engine that is configured to perform the functionality of the PCIe data routing engines and/or modular PCIe connect subsystems discussed below, and that one of skill in the art in possession of the present disclosure will appreciate may be coupled to any or all of the connectors 904a-904c. However, while a specific modular PCIe connect subsystem 900 has been illustrated and described, one of skill in the art in possession of the present disclosure will recognize that modular intermediary subsystems (or other devices operating according to the teachings of the present disclosure in a manner similar to that described below for the modular PCIe connect subsystem 900) may include a variety of components and/or component configurations for providing the functionality discussed below while remaining within the scope of the present disclosure as well.

Figure 10:
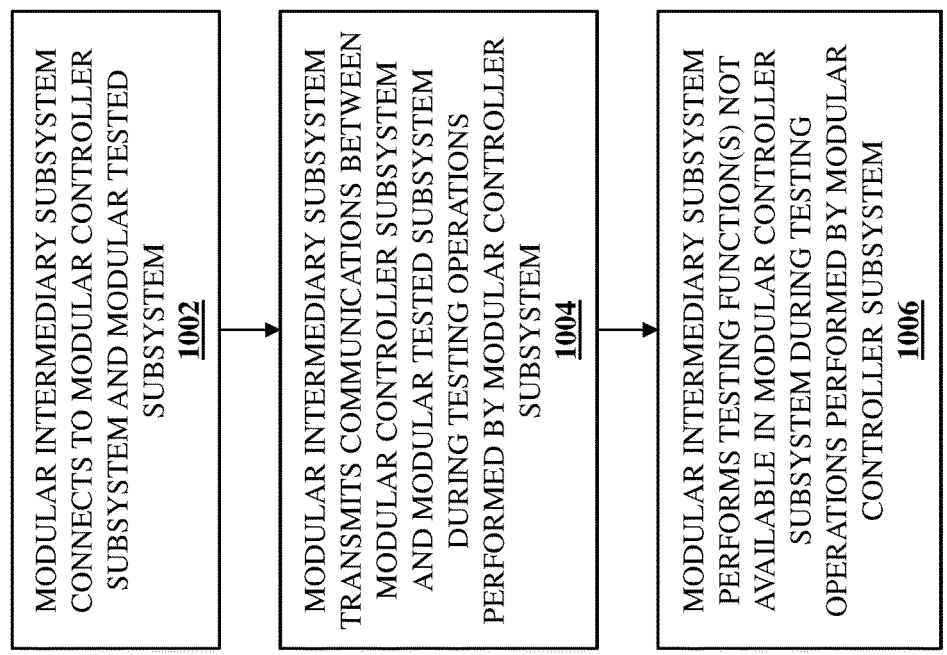
FIG. 10 is a flow chart illustrating an embodiment of a method for modular testing of a tested subsystem.

Referring now to FIG. 10, an embodiment of a method 1000 for modular testing of a tested subsystem is illustrated. As discussed below, the systems and methods of the present disclosure provide a modular test system with modular intermediary subsystems that may be provided to couple a modular controller subsystem to a modular tested subsystem, with any of the modular intermediary subsystems configured to perform a testing function that is not available in the modular controller subsystem during testing operations. For example, the modular test system of the present disclosure may include a modular controller subsystem coupled to a modular tested subsystem by a modular intermediary subsystem. The modular intermediary subsystem transmits communications between the modular controller subsystem and the modular tested subsystem during testing operations performed by the modular controller subsystem, and performs at least one testing function that is not available in the modular controller subsystem during the testing operations performed by the modular controller subsystem. As such, the modular tested subsystem may have different usages and functions tested by interchanging different modular intermediary subsystems between the modular controller subsystem and that modular tested subsystem and using those modular intermediary subsystems to perform testing functions during testing operations, such as power measurement functions and data debug functions, that are not available in the modular controller subsystem that is performing those testing operations.

In some embodiments the method 1000 may be preceded by first testing operations being performed by the modular controller subsystem 300 with the modular tested subsystem. As will be appreciated by one of skill in the art in possession of the present disclosure, modular tested subsystems may be provided with any of a variety of desired operating characteristics and/or conditions prior to any of the testing operations discussed below. For example, with reference to the modular media subsystem 400 having the media devices 404 that may be provided by storage media such as NAND storage subsystems, those NAND storage subsystems may be provided at some Program/Erase (P/E) cycle level by, for example, writing and erasing data to NAND blocks in the NAND storage subsystems until a desired P/E cycle level has been reached, may have data written to the NAND blocks in the NAND storage subsystems and then those NAND storage subsystems may be subjected to elevated temperatures (e.g., during a "bake" operation) in order to accelerate data retention effects, and/or may be subjected too other techniques that provide desired operating characteristics/conditions known in the art.

Figure 11:
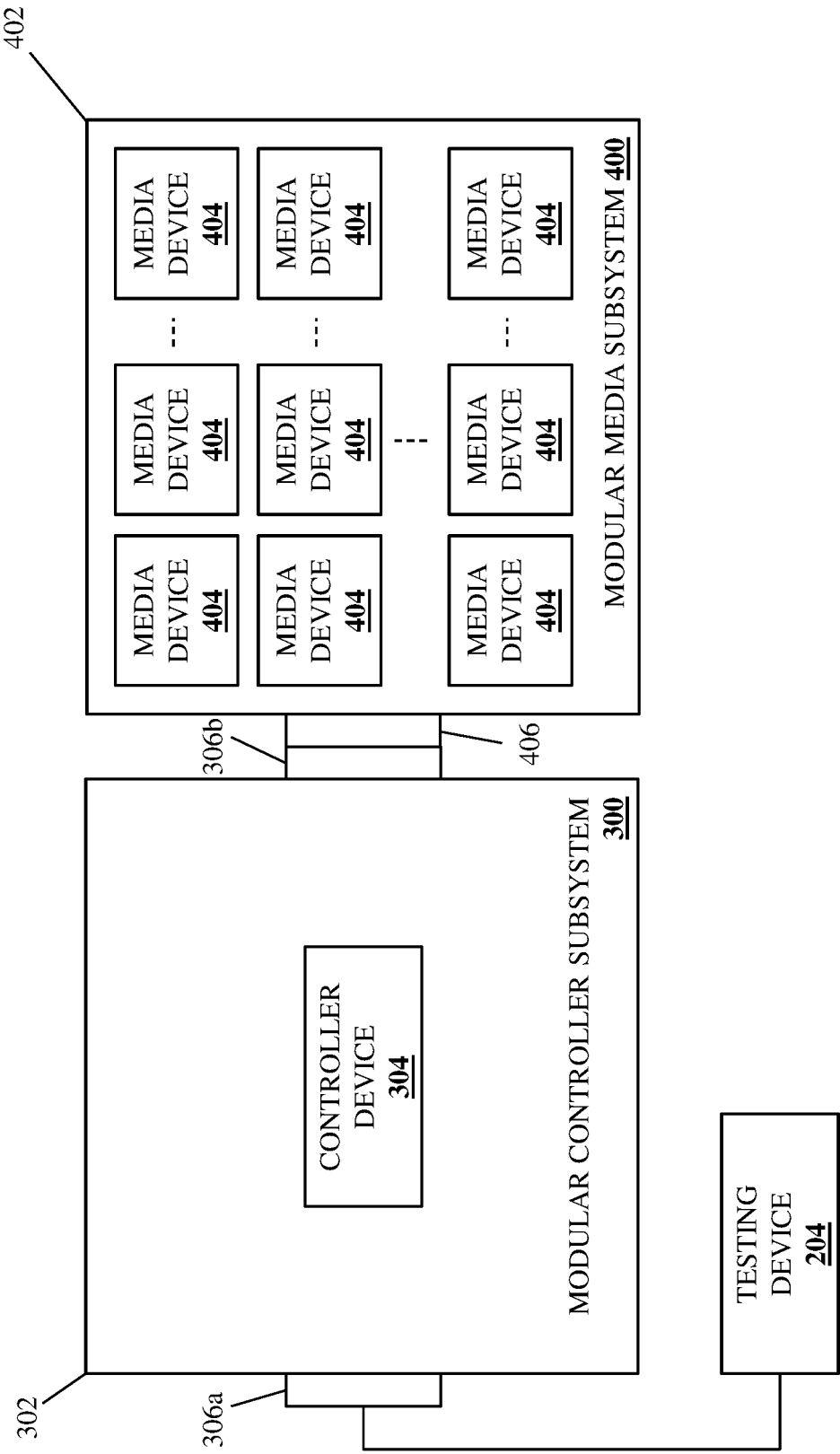
FIG. 11 is a schematic view illustrating an embodiment of the modular controller subsystem of FIG. 3 connected to the modular media subsystem of FIG. 4 to provide the modular test system of FIG. 2.

With reference to FIG. 11, one of the testing device(s) 204 discussed above with reference to FIG. 2 may be coupled to the connector 306a on the modular controller subsystem 300 by, for example, connecting a cable between the testing device 204 and the connector 306a on the modular controller subsystem 300, directly connecting the connector 306a on the modular controller subsystem 300 to a corresponding connector on the testing device 204, and/or providing other couplings that would be apparent to one of skill in the art in possession of the present disclosure. Furthermore, the modular media subsystem 400 may be coupled to the modular controller subsystem 300 by connecting the connector 406 on the modular media subsystem 400 to the connector 306b on the modular controller subsystem 300. Subsequently, the testing device 204 and the modular controller device 300 may operate to perform first testing operations with the modular media subsystem 400. As will be appreciated by one of skill in the art in possession of the present disclosure, different modular media subsystems with different configurations (e.g., different media packaging, different Ball Grid Array (BGA) styles, etc.), media device types (e.g., different NAND types), etc. may be provided with the modular controller subsystem 300 as illustrated in FIG. 11 and tested as described below while remaining within the scope of the present disclosure.

To provide a specific example, the first testing operations performed by the testing device 204 and the modular controller device 300 with the modular media subsystem 400 may include high-speed data transmission testing operations that may include a user generating high-speed data transmission testing operation instructions using the testing device 204, the testing device 204 providing those high-speed data transmission testing operation instructions to the controller device 304 on the modular controller subsystem 300. The controller device 304 may then convert those high-speed data transmission testing operation instructions to high-speed data transmission testing operation commands and transmit those high-speed data transmission testing operation commands to any of the media device(s) 404 on the modular media subsystem 400, or may generate data and transmit that data to any of the media device(s) 404 on the modular media subsystem 400, or may receive data from any of the media device(s) 404 on the modular media subsystem 400, and/or may perform any other high-speed data transmission operations that would be apparent to one of skill in the art in possession of the present disclosure. However, while high-speed data transmission operations are described and referenced in the examples below, one of skill in the art in possession of the present disclosure will appreciate how the modular controller subsystem 300 may perform a variety of different first testing operations when directly connected to the modular media subsystem 400/modular tested subsystem as illustrated in FIG. 11 while remaining within the scope of the present disclosure as well.

In some specific examples, the first testing operations performed by the modular controller subsystem 300 with the modular media subsystem 400/modular tested subsystem may experience issues that can be analyzed by further testing that requires testing functionality that is not available in the modular controller subsystem 300. For example, with reference to the high-speed data transmission testing operation discussed above, a command-fail issue may result in which data requested from a media device 404 is not received back by the controller device 304 on the modular controller subsystem 300 or the testing device 204, and may require debug data analyzing functionality that allows particular communication/signal data exchanged with the media devices 404 on the modular media subsystem 400 to be identified and analyzed, and that is not available on the modular controller subsystem 300. For example, as discussed above, the components and/or configurations required to perform the debug data analyzing functionality may, if provided on the modular controller subsystem 300, prevent or hinder the performance of the high-speed data transmission testing functionality discussed above, and thus that functionality may not be provided on the modular controller subsystem 300.

Similarly, an issue may result with the high-speed data transmission testing operations, and may require power measurement functionality discussed above that allows power consumption by the media devices 404 on the modular media subsystem 400 to be identified and analyzed, and that is not available on the modular controller subsystem 300. For example, as discussed above, the components and/or configurations required to perform the power measurement functionality may, if provided on the modular controller subsystem 300, prevent or hinder the performance of the high-speed data transmission testing functionality discussed above, and thus that functionality may not be provided on the modular controller subsystem 300. However, while the need for functionality not available in the modular controller subsystem 300 has been described as being provided by an modular intermediary subsystem in response to issues that occur during testing operations using functionality provided by the modular controller subsystem 300, the functionality that is not available in the modular controller subsystem 300 may be required absent an issue occurring during testing operations using functionality provided by the modular controller subsystem 300 while remaining within the scope of the present disclosure as well. Furthermore, while particular functionality that is not available in the modular controller subsystem 300 is described herein, one of skill in the art in possession of the present disclosure will appreciate how any functionality not available in the modular controller subsystem 300 may be needed for testing operations in some embodiments while remaining within the scope of the present disclosure.

The method 1000 begins at block 1002 where a modular intermediary subsystem connects to a modular controller subsystem and a modular tested subsystem. As will be appreciated by one of skill in the art in possession of the present disclosure, any of a variety of modular intermediary subsystems may be utilized to connect the modular controller subsystem to the modular tested subsystem in order to, for example, perform some testing functionality that is not available in the modular controller subsystem and required based on issues resulting from testing operations that were previously performed by the modular controller subsystem with the modular tested subsystem, or perform some testing functionality that is not available in the modular controller subsystem regardless of any testing operations that were previously performed by the modular controller subsystem with the modular tested subsystem.

Figure 12:
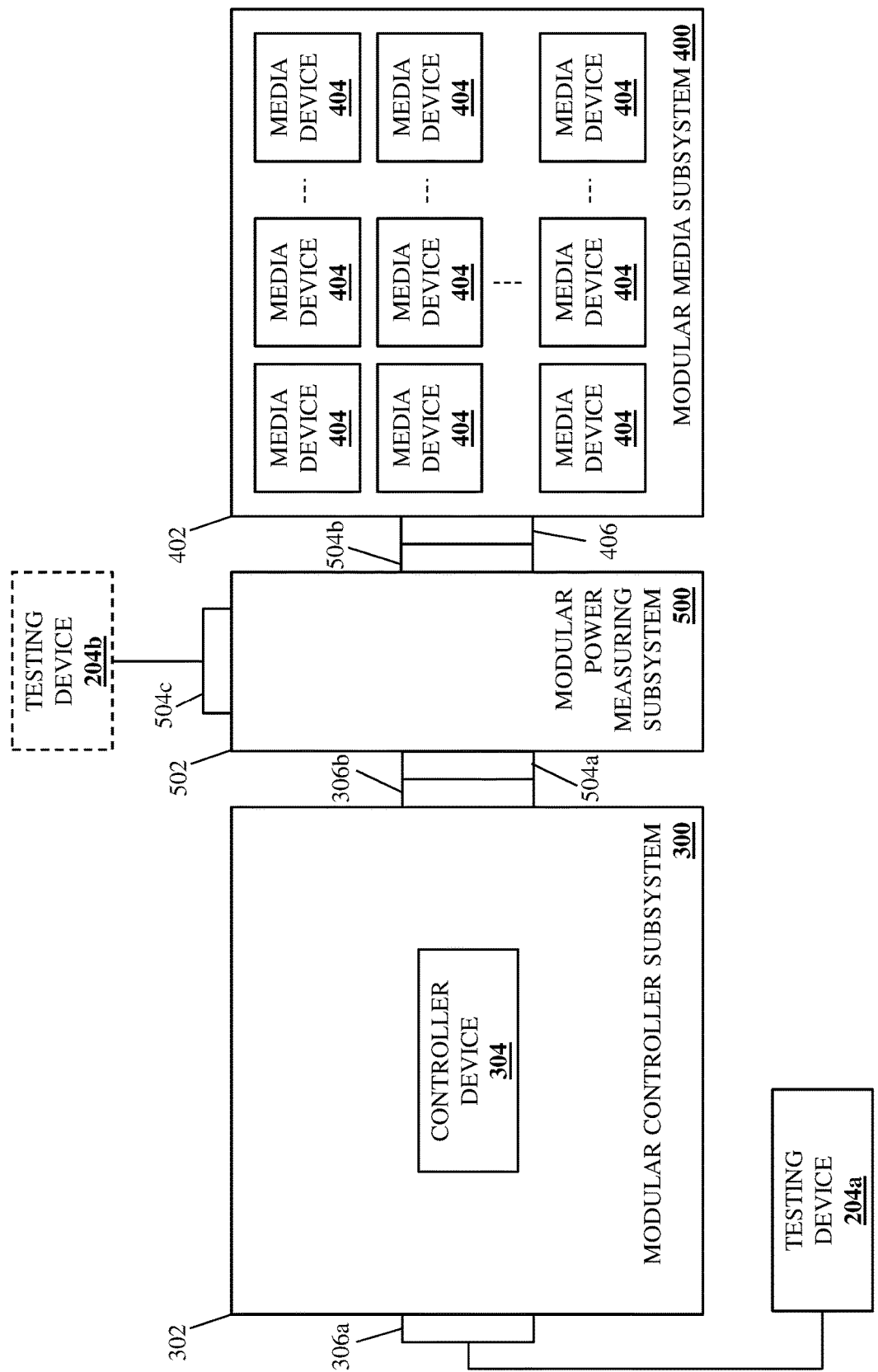
FIG. 12 is a schematic view illustrating an embodiment of the modular controller subsystem of FIG. 3 connected to the modular media subsystem of FIG. 4 by the modular power measuring subsystem of FIG. 5 to provide the modular test system of FIG. 2 during the method of FIG. 10.

For example, with reference to FIG. 12, at block 1002 one of the testing device(s) 204a discussed above with reference to FIG. 2 may be coupled to the connector 306a on the modular controller subsystem 300 by, for example, connecting a cable between the testing device 204a and the connector 306a on the modular controller subsystem 300, directly connecting the connector 306a on the modular controller subsystem 300 to a corresponding connector on the testing device 204a, and/or providing other couplings that would be apparent to one of skill in the art in possession of the present disclosure. Furthermore, the modular media subsystem 400 may be coupled to the modular controller subsystem 300 by connecting the connector 406 on the modular media subsystem 400 to the connector 504b on the modular power measuring subsystem 500, and connecting the connector 306b on the modular controller subsystem 300 to the connector 504a on the modular power measuring subsystem 500.

Furthermore, as discussed below, in some embodiments another of the testing device(s) 204b discussed above with reference to FIG. 2 may be coupled to the connector 504c on the modular power measuring subsystem 500 by, for example, connecting a cable between the testing device 204b and the connector 504c on the modular power measuring subsystem 500, directly connecting the connector 504c on the modular power measuring subsystem 500 to a corresponding connector on the testing device 204b, and/or providing other couplings that would be apparent to one of skill in the art in possession of the present disclosure. However, one of skill in the art in possession of the present disclosure will appreciate how the connection of the testing device 204b to the modular power measuring subsystem 500 is optional (e.g., as indicated by the dashed lines used for the testing device 204b), as the functionality of the testing device 204b may be integrated with the modular power measuring subsystem 500.

For example, the modular power measuring subsystem 500 may be utilized to couple the modular media subsystem 400 to the modular controller subsystem 300 in order to perform power measurement functionality that is not available in the modular controller subsystem 300 and that may include measuring power consumed by the modular media subsystem 400 during the testing operations performed by the modular controller subsystem 300. However, in embodiments in which the modular power measuring subsystem 500 is not configured to perform the power measurement functionality discussed above (e.g., when that power measurement functionality requires components/configurations that may not be supported on the chassis 502 of the modular power measuring subsystem 500), the modular power measuring subsystem 500 may be utilized to couple the modular media subsystem 400 to the modular controller subsystem 300 in order to perform power measurement data routing functionality that is not available in the modular controller subsystem 300 and that may include routing power consumption data generated by the modular media subsystem 400 to the testing device 204b, with that testing device 204b then using that power consumption data to measure power consumed by the modular media subsystem 400 during the testing operations performed by the modular controller subsystem 300.

Furthermore, while some examples herein describe the performance of the power measurement functionality or the power measurement data routing functionality by the modular power measuring subsystem 500 in response to issue with previous testing operations performed by the modular controller subsystem 300 with the modular media subsystem 400, the power measurement functionality or the power measurement data routing functionality may be performed by the modular power measuring subsystem 500 regardless of any other testing operations being performed on the modular media subsystem 400 while remaining within the scope of the present disclosure as well.

Figure 13:
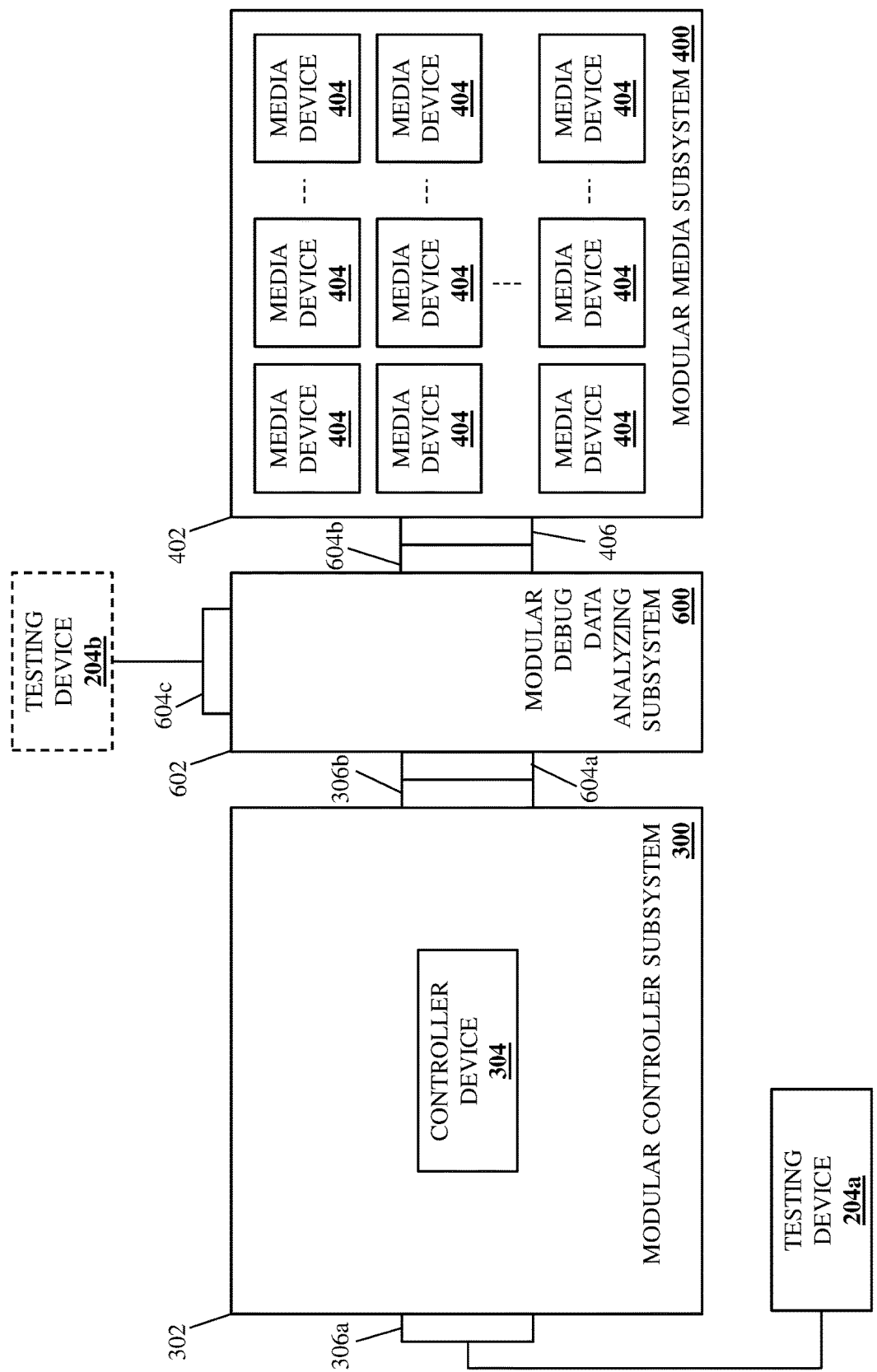
FIG. 13 is a schematic view illustrating an embodiment of the modular controller subsystem of FIG. 3 connected to the modular media subsystem of FIG. 4 by the modular debug data analyzing subsystem of FIG. 6 to provide the modular test system of FIG. 2 during the method of FIG. 10.

In another example, with reference to FIG. 13, at block 1002 one of the testing device(s) 204a discussed above with reference to FIG. 2 may be coupled to the connector 306a on the modular controller subsystem 300 by, for example, connecting a cable between the testing device 204a and the connector 306a on the modular controller subsystem 300, directly connecting the connector 306a on the modular controller subsystem 300 to a corresponding connector on the testing device 204a, and/or providing other couplings that would be apparent to one of skill in the art in possession of the present disclosure. Furthermore, the modular media subsystem 400 may be coupled to the modular controller subsystem 300 by connecting the connector 406 on the modular media subsystem 400 to the connector 604b on the modular debug data analyzing subsystem 600, and connecting the connector 306b on the modular controller subsystem 300 to the connector 604a on the modular debug data analyzing subsystem 600.

Furthermore, as discussed below, in some embodiments another of the testing device(s) 204b discussed above with reference to FIG. 2 may be coupled to the connector 604c on the modular debug data analyzing subsystem 600 by, for example, connecting a cable between the testing device 204b and the connector 604c on the modular debug data analyzing subsystem 600, directly connecting the connector 604c on the modular debug data analyzing subsystem 600 to a corresponding connector on the testing device 204b, and/or providing other couplings that would be apparent to one of skill in the art in possession of the present disclosure. However, one of skill in the art in possession of the present disclosure will appreciate how the connection of the testing device 204b to the modular debug data analyzing subsystem 600 is optional (e.g., as indicated by the dashed lines used for the testing device 204b), as the functionality of the testing device 204b may be integrated with the modular debug data analyzing subsystem 600.

For example, the modular debug data analyzing subsystem 600 may be utilized to couple the modular media subsystem 400 to the modular controller subsystem 300 in order to perform data debug analyzing functionality that is not available in the modular controller subsystem 300 and that may include analyzing debug data generated by the modular media subsystem 400 during the testing operations performed by the modular controller subsystem 300. However, in embodiments in which the modular debug data analyzing subsystem 600 is not configured to perform the debug data analyzing functionality discussed above (e.g., when that debug data analyzing functionality requires components/configurations that may not be supported on the chassis 602 of the modular debug data analyzing subsystem 600), the modular debug data analyzing subsystem 600 may be utilized to couple the modular media subsystem 400 to the modular controller subsystem 300 in order to perform debug data routing functionality that is not available in the modular controller subsystem 300 and that may include routing debug data generated by the modular media subsystem 400 to the testing device 204b, with that testing device 204b then analyzing debug data generated by the modular media subsystem 400 during the testing operations performed by the modular controller subsystem 300.

Furthermore, while some examples herein describe the performance of the debug data analyzing functionality or the debug data routing functionality by the modular debug data analyzing subsystem 600 in response to issue with previous testing operations performed by the modular controller subsystem 300 with the modular media subsystem 400, the debug data analyzing functionality or the debug data routing functionality may be performed by the modular debug data analyzing subsystem 600 regardless of any other testing operations being performed on the modular media subsystem 400 while remaining within the scope of the present disclosure as well.

Figure 14:
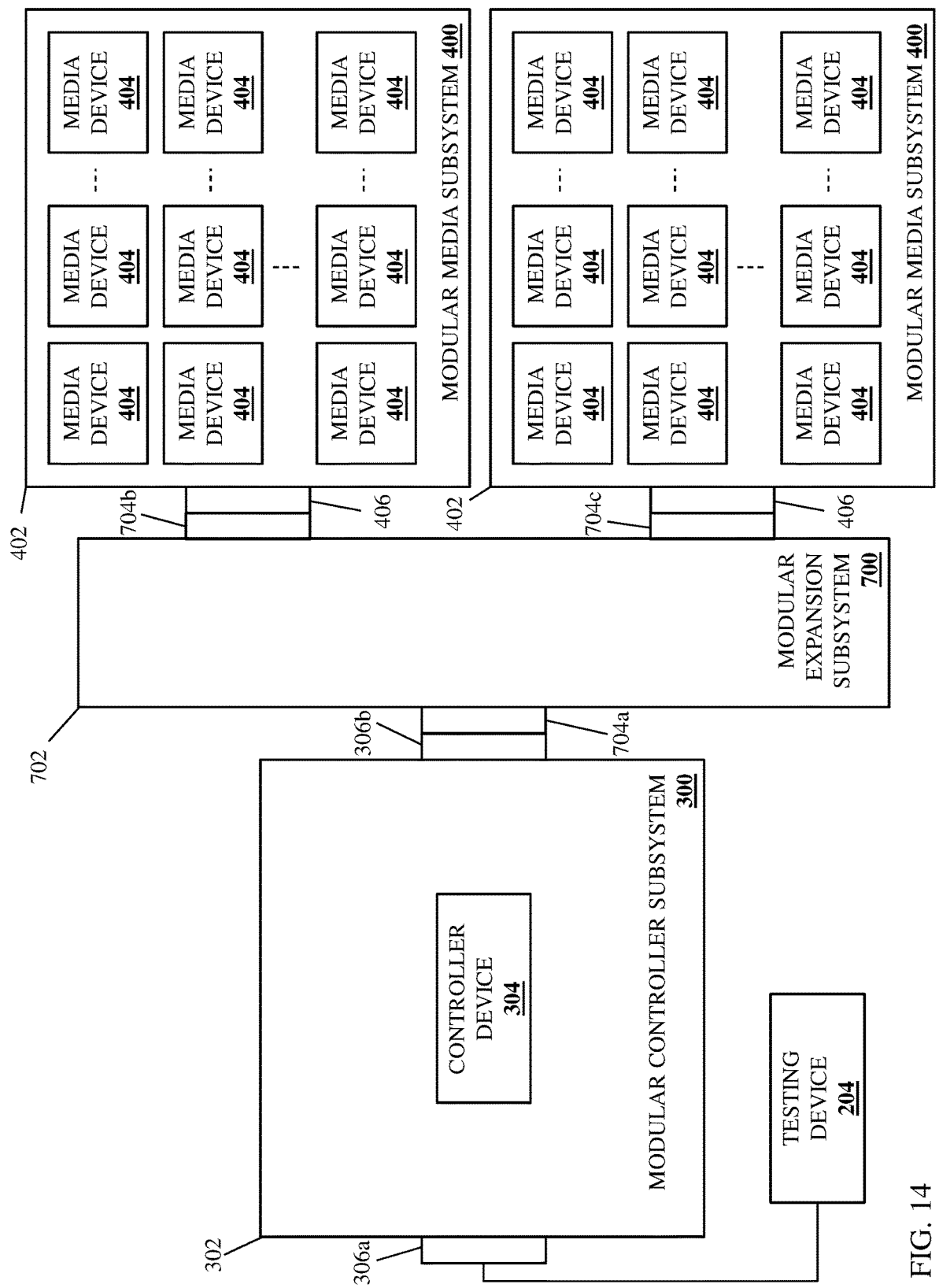
FIG. 14 is a schematic view illustrating an embodiment of the modular controller subsystem of FIG. 3 connected to a plurality of the modular media subsystem of FIG. 4 by the modular expansion subsystem of FIG. 7 to provide the modular test system of FIG. 2 during the method of FIG. 10.

In another example, with reference to FIG. 14, at block 1002 one of the testing device(s) 204 discussed above with reference to FIG. 2 may be coupled to the connector 306a on the modular controller subsystem 300 by, for example, connecting a cable between the testing device 204 and the connector 306a on the modular controller subsystem 300, directly connecting the connector 306a on the modular controller subsystem 300 to a corresponding connector on the testing device 204, and/or providing other couplings that would be apparent to one of skill in the art in possession of the present disclosure. Furthermore, a plurality of modular media subsystems 400 may be coupled to the modular controller subsystem 300 by connecting the connector 406 on each respective modular media subsystem 400 to one of the connectors 704b and 704c on the modular expansion subsystem 700, and connecting the connector 306b on the modular controller subsystem 300 to the connector 704a on the modular expansion subsystem 700. As will be appreciated by one of skill in the art in possession of the present disclosure, the modular expansion subsystem 700 may enable testing operations in which a maximum quantity of modular media subsystems or media devices are tested, particularly when expansion-based performance losses are acceptable in those testing operations (e.g., long-term data retention testing operations where scanning requirements are relatively low).

In some embodiments, the modular expansion subsystem 700 performs an expansion functionality that is not available in the modular controller subsystem 300 and that allows the plurality of modular media subsystems 400 to be coupled to the modular controller subsystem 300 in order to allow the modular controller subsystem 300 to perform testing operations on each of the plurality of modular media subsystems 400. Furthermore, while not illustrated or described herein in detail, one of skill in the art in possession of the present disclosure will appreciate how the other modular intermediary subsystems described herein (e.g., the modular power measurement subsystem 500 and the modular data debug analyzer subsystem 600 discussed above, the modular PCIe connect subsystem 900 described below) may be utilized to couple any of the modular media subsystems 400 to the modular expansion subsystem 700 in a manner similar to that described above with regard to their coupling the modular media subsystem 400 to the modular controller subsystem 300.

Figure 15:
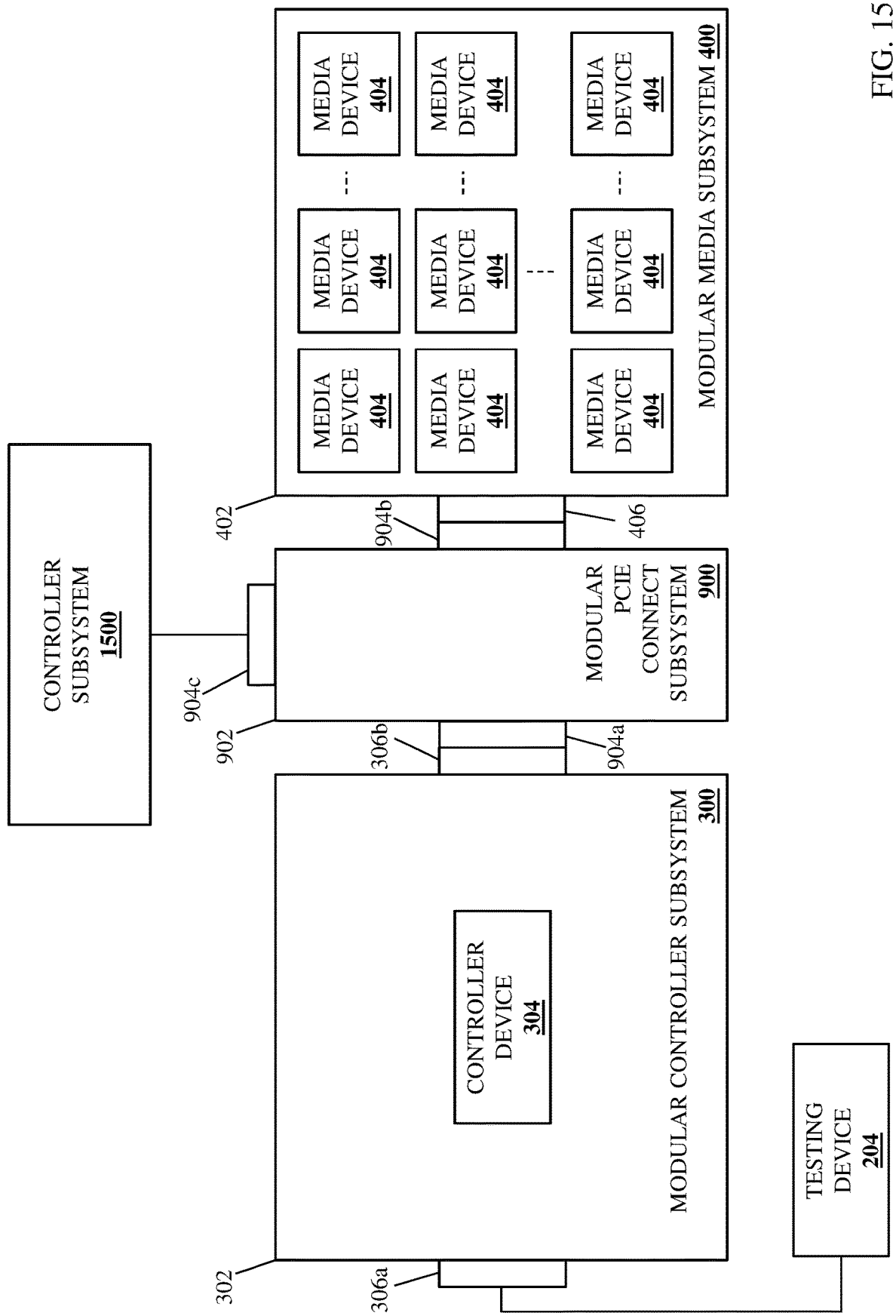
FIG. 15 is a schematic view illustrating an embodiment of the modular controller subsystem of FIG. 3 connected to the modular media subsystem of FIG. 4 by the modular PCIe connect subsystem of FIG. 9 to provide the modular test system of FIG. 2 during the method of FIG. 10.

In another example, with reference to FIG. 15, at block 1002 one of the testing device(s) 204a discussed above with reference to FIG. 2 may be coupled to the connector 306a on the modular controller subsystem 300 by, for example, connecting a cable between the testing device 204a and the connector 306a on the modular controller subsystem 300, directly connecting the connector 306a on the modular controller subsystem 300 to a corresponding connector on the testing device 204a, and/or providing other couplings that would be apparent to one of skill in the art in possession of the present disclosure. Furthermore, the modular media subsystem 400 may be coupled to the modular controller subsystem 300 by connecting the connector 406 on the modular media subsystem 400 to the connector 904b on the modular PCIe connect subsystem 900, and connecting the connector 306b on the modular controller subsystem 300 to the connector 904a on the modular PCIe connect subsystem 900.

Furthermore, as discussed below, controller subsystem 1500 may be coupled to the connector 904c on the modular PCIe connect subsystem 900 by, for example, connecting a cable between the controller subsystem 1500 and the connector 904c on the modular PCIe connect subsystem 900, directly connecting the connector 904c on the modular PCIe connect subsystem 900 to a corresponding connector on the controller subsystem 1500, and/or providing other couplings that would be apparent to one of skill in the art in possession of the present disclosure. In some embodiments, the modular PCIe connect subsystem 900 may be utilized to couple the modular media subsystem 400, the modular controller subsystem 300, and the controller subsystem 1500 to each other in order to allow the modular controller subsystem 300 and the controller subsystem 1500 to perform testing operations on the modular media subsystem 400. For example, the controller subsystem 1500 is described in specific examples below as a developmental controller that is configured with limiting testing functionality relative to the modular controller subsystem 300, and the controller subsystem 1500 utilizes the modular controller subsystem 300 to perform at least some testing operations with the modular media subsystem 400. However, while the connection of a particular controller subsystem to the modular PCIe connect subsystem 900 is described, one of skill in the art in possession of the present disclosure will appreciate how the connection of other PCIe devices to the modular PCIe connect subsystem 900 will fall within the scope of the present disclosure as well.

As such, one of skill in the art in possession of the present disclosure will recognize that a user of the modular test system of the present disclosure may have a plurality of the modular intermediary subsystems that are each configured to perform a respective testing function that is not available from the modular controller subsystem, and may utilize any of those modular intermediary subsystems to couple the modular controller subsystem to the modular tested subsystem depending on the type of testing operations that are desired. However, while a few specific modular intermediary subsystems are illustrated and described herein, one of skill in the art in possession of the present disclosure will appreciate how other modular intermediary subsystems that provide other testing functionality not available in the modular controller subsystem will fall within the scope of the present disclosure as well. For example, a modular error testing subsystem may be provided as a modular intermediary subsystem and may be configured to inject errors into NAND storage subsystems in order to, for example, test error correction capabilities of the NAND storage subsystems, add delays in some signals so that some data is received later than other data in order to test the ability of the NAND storage subsystems to manage such delays (i.e., based on an allowable "skew" in those signals), and/or perform other error-based testing that would be apparent to one of skill in the art in possession of the present disclosure.

The method 1000 then proceeds to block 1004 where the modular intermediary subsystem transmits communications between the modular controller subsystem and the modular tested subsystem during testing operations performed by the modular controller subsystem. In an embodiment, at block 1004, a testing device and the modular controller subsystem may perform testing operations that include exchanging communications with the modular tested subsystem, and the modular intermediary subsystem that couples the modular controller subsystem to the modular tested subsystem will transmit those communications between the modular controller subsystem and the modular tested subsystem. For example, a user may generate testing operation instructions using the testing device 204, the testing device 204 may provide those testing operation instructions to the controller device 304 on the modular controller subsystem 300, and the controller device 304 may convert those testing operation instructions to testing operation commands and transmit those testing operation commands to the modular intermediary subsystem such that the modular intermediary subsystem transmits those testing operation commands to any of the media device(s) 404 on the modular media subsystem 400.

Similarly, a user may generate testing operation instructions using the testing device 204, the testing device 204 may provide those testing operation instructions to the controller device 304 on the modular controller subsystem 300, and the controller device 304 may generate data in response to those testing operation instructions and transmit that data to the modular intermediary subsystem such that the modular intermediary subsystem transmits that data to any of the media device(s) 404 on the modular media subsystem 400. Furthermore, any of the media devices 404 on the modular media subsystem 400 may generate data in response to data or testing operating commands received via the modular intermediary subsystem from the modular controller device 300, and transmit that data to the modular intermediary subsystem such that the modular intermediary subsystem transmits that data to the controller device 304 on the modular controller subsystem 300.

For example, with reference to the modular power measuring subsystem 500 discussed above with reference to FIGS. 5 and 12, the chassis 502/circuit board in the modular power measuring subsystem 500 may include a first modular intermediary board subsystem that may be provided by circuitry (e.g., the traces, wiring, couplings, etc. discussed above) that is configured to transmit communications between the connectors 504*a* and 504*b* during testing operations, and thus at block 1004 the first modular intermediary board subsystem may be utilized to transmit the communications exchanged between the modular controller subsystem 300 and the modular media subsystem 400 during the testing operations performed by the testing device 204*a* and the modular controller subsystem 300. For example, the circuitry provided by the first modular intermediary board subsystem on the modular power measuring subsystem 500 may provide "through" connections that are configured to transmit power and data to enable "normal" operation of the modular media subsystem 400.

In another example, with reference to the modular debug data analyzing subsystem 600 discussed above with reference to FIGS. 6 and 13, the chassis 602/circuit board in the modular debug data analyzing subsystem 600 may include a first modular intermediary board subsystem that may be provided by circuitry (e.g., the traces, wiring, couplings, etc. discussed above) that is configured to transmit communications between the connectors 604*a* and 604*b* during testing operations, and thus at block 1004 the first modular intermediary board subsystem may be utilized to transmit the communications exchanged between the modular controller subsystem 300 and the modular media subsystem 400 during the testing operations performed by the testing device 204*a* and the modular controller subsystem 300. For example, the circuitry provided by the first modular intermediary board subsystem on the modular debug data analyzing subsystem 600 may provide "through" connections that are configured to transmit power and data to enable "normal" operation of the modular media subsystem 400.

In another example, with reference to the modular expansion subsystem 700 discussed above with reference to FIGS. 7 and 14, the chassis 702/circuit board in the modular expansion subsystem 700 may include a first modular intermediary board subsystem that may be provided by circuitry (e.g., the traces, wiring, couplings, etc. discussed above) that is configured to transmit communications between the connector 704*a* and the connector 704*b* during testing operations, and thus at block 1004 the first modular intermediary board subsystem may be utilized to transmit the communications exchanged between the modular controller subsystem 300 and the modular media subsystem 400 that is connected to the connector 704*b* during the testing operations performed by the testing device 204 and the modular controller subsystem 300. For example, the circuitry provided by the first modular intermediary board subsystem on the modular expansion subsystem 700 may provide "through" connections that are configured to transmit power and data to enable "normal" operation of the modular media subsystems 400.

In another example, with reference to the modular expansion subsystem 900 discussed above with reference to FIGS. 9 and 15, the chassis 902/circuit board in the modular PCIe connect subsystem 900 may include a first modular intermediary board subsystem that may be provided by circuitry (e.g., the traces, wiring, couplings, etc. discussed above) that is configured to transmit communications between the connectors 904*a* and 904*b* during testing operations, and thus at block 1004 the first modular intermediary board subsystem may be utilized to transmit the communications exchanged between the modular controller subsystem 300 and the modular media subsystem 400 during the testing operations performed by the testing device 204 and the modular controller subsystem 300. For example, the circuitry provided by the first modular intermediary board subsystem on the modular expansion subsystem 900 may provide "through" connections that are configured to transmit power and data to enable "normal" operation of the modular media subsystems 400.

The method 1000 then proceeds to block 1006 where the modular intermediary subsystem performs testing function(s) that are not available in the modular controller subsystem during the testing operations performed by the modular controller subsystem. In an embodiment, at block 1006 and while the testing device and the modular controller subsystem are performing the testing operations discussed above, the modular intermediary subsystem that couples the modular controller subsystem to the modular tested subsystem may perform at least one testing operation that is not available in the modular controller subsystem.

For example, with reference to the modular power measuring subsystem 500 discussed above with reference to FIGS. 5 and 12, the chassis 502/circuit board in the modular power measuring subsystem 500 may include a second modular intermediary board subsystem that may be provided by circuitry (e.g., the traces, wiring, couplings, etc. discussed above) that is configured to transmit data received at the connector 504*b* to the connector 504*c*, and at block 1006 that second modular intermediary board subsystem may perform power measurement data routing function to route power measurement data generated by the media devices 404 in the modular media subsystem 400 during the testing operations performed by the modular controller subsystem 300 to the testing device 204*b*, with the testing device 204*b* performing a power management function to, for example, measure power consumed by the media devices 404 in the modular media subsystem 400 during the testing operations performed by the modular controller subsystem 300. However, in other embodiments, the second modular intermediary board subsystem on the chassis 502/circuit board may provide a power measuring engine that is configured to provide processing functionality that performs the power management function to, for example, measure power consumed by the media devices 404 in the modular media subsystem 400 during the testing operations performed by the modular controller subsystem 300, and may generate corresponding power consumption data and transmit that power consumption data via the connector 504*a* to the controller device 304 (which may then provide that power consumption data to the testing device 204*a*).

In another example, with reference to the modular debug data analyzing subsystem 600 discussed above with reference to FIGS. 6 and 13, the chassis 602/circuit board in the modular debug data analyzing subsystem 600 may include a second modular intermediary board subsystem that may be provided by circuitry (e.g., the traces, wiring, couplings, etc. discussed above) that is configured to transmit data received at the connector 604*b* to the connector 604*c*, and at block 1006 that second modular intermediary board subsystem may perform debug data routing function to route debug data generated by the media devices 404 in the modular media subsystem 400 during the testing operations performed by the modular controller subsystem 300 to the testing device 204*b*, with the testing device 204*b* performing a debug data analyzing function to, for example, analyze debug data generated by the media devices 404 in the modular media subsystem 400 during the testing operations performed by the modular controller subsystem 300. However, in other embodiments, the second modular intermediary board subsystem on the chassis 602/circuit board may provide a debug data analyzing engine that is configured to provide processing functionality that performs the debug data analyzing function to, for example, analyze debug data generated by the media devices 404 in the modular media subsystem 400 during the testing operations performed by the modular controller subsystem 300, and may generate corresponding debug analysis data and transmit that debug analysis data via the connector 604*a* to the controller device 304 (which may then provide that debug analysis data to the testing device 204*a*). As will be appreciated by one of skill in the art in possession of the present disclosure, the debug data analyzing functions discussed above may include analyzing timing operations, analyzing bus operations, determining whether data is being read/written at the right time, and/or other debug data analyzing functions that would be apparent to one of skill in the art in possession of the present disclosure.

In another example, with reference to the modular expansion subsystem 700 discussed above with reference to FIGS. 7 and 14, the chassis 702/circuit board in the modular debug data analyzing subsystem 700 may include a second modular intermediary board subsystem that may be provided by circuitry (e.g., the traces, wiring, couplings, etc. discussed above) that is configured to route communications between the connector 704*a* and the connector 704*c*, and at block 1006 that second modular intermediary board subsystem may perform expansion communication routing function to transmit the communications exchanged between the modular controller subsystem 300 and media devices 404 in the modular media subsystem 400 connected to the connector 704*c* during the testing operations performed by the modular controller subsystem 300. Furthermore, in some embodiments, the second modular intermediary board subsystem on the chassis 702/circuit board may provide an expansion communication routing engine that is configured to provide processing functionality that performs the expansion communication routing function to, for example, process and transmit the communications exchanged between the modular controller subsystem 300 and media devices 404 in the modular media subsystems 400 connected to the connectors 704*b* and 704*c* during the testing operations performed by the modular controller subsystem 300.

In another example, with reference to the modular PCIe connect subsystem 900 discussed above with reference to FIGS. 9 and 15, the chassis 902/circuit board in the modular PCIe connect subsystem 900 may include a second modular intermediary board subsystem that may be provided by circuitry (e.g., the traces, wiring, couplings, etc. discussed above) that is configured to transmit data between the connectors 904*a*, 904*b*, and 904*c*, and at block 1006 that second modular intermediary board subsystem may perform PCIe connect communication routing functions to receive communications from a subsystem connected to any of those connectors 904*a*-904*c* during the testing operations performed by the modular controller subsystem 300 and route those communications to a subsystem connected to any other of those connectors. Furthermore, in some embodiments, the second modular intermediary board subsystem on the chassis 902/circuit board may provide a PCIe connect communication routing engine that is configured to provide processing functionality that performs the PCIe connect communication routing functions to receive communications from a subsystem connected to any of those connectors 904*a*-904*c* during the testing operations performed by the modular controller subsystem 300 and route those communications to a subsystem connected to any other of those connectors.

To provide a specific example of the operation of the embodiment of the modular test system illustrated in FIG. 15, the controller subsystem 1500 may be provided by a developmental controller that may not be fully programmed to perform all testing operations on the modular media subsystem 400, while the modular controller subsystem 300 may be configured to perform all testing operations on the modular media subsystem 400. As such, at block 1006, the second modular intermediary board subsystem in the modular PCIe connect subsystem 900 may route some communications between the controller subsystem 1500 and the media devices 404 in the modular media subsystem 400 (i.e., communications associated with the testing operations the controller subsystem 1500 is configured to perform), while routing some communications (e.g., relatively high-level commands) between the controller subsystem 1500 and the controller device 304 in the modular controller subsystem 300 (i.e., communications associated with the testing operations the controller subsystem 1500 is not configured to perform).

As will be appreciated by one of skill in the art in possession of the present disclosure, when the modular controller subsystem 300 receives communication from the controller subsystem 1500 associated with testing operations that the controller subsystem 1500 is not configured to perform, the modular controller subsystem 300 may transmit corresponding communications (e.g., relatively low-level commands such as Firmware Translation Layer (FTL) commands, NAND commands, etc.) to the media devices 404 in the modular media subsystem 400 that are configured to perform the testing operations that the controller subsystem 1500 is not configured to perform. Thus, some embodiments of the modular PCI connect subsystem 900 allow a developmental controller to be tested with media devices, while using the modular controller subsystem 300 to provide for any testing operations the developmental controller is not configured to perform. Furthermore, one of skill in the art in possession of the present disclosure will appreciate that the operations discussed above (e.g., the NAND/FTL abstraction operations for the controller subsystem 1500 using the modular controller subsystem 300) may allow for the testing of developmental controller functionality by leveraging "legacy" low-level NAND firmware on an existing "legacy" modular controller subsystem.

As will be appreciated by one of skill in the art in possession of the present disclosure, in embodiments in which one of the modular intermediary subsystems of the present disclosure was utilized subsequent to testing operations performed by the modular controller subsystem 300 in which an issue was experienced that required testing functions that are enabled by that modular intermediary subsystem and that are not available in the modular controller subsystem 300, that modular intermediary subsystem may be removed from the modular test system 200 so that the modular controller subsystem 300 and modular media subsystem 400 may again be directly connected in order to complete the testing operations (e.g., the high-speed data transmission testing operations discussed above) being performed by the modular controller subsystem 300.

Figure 16:
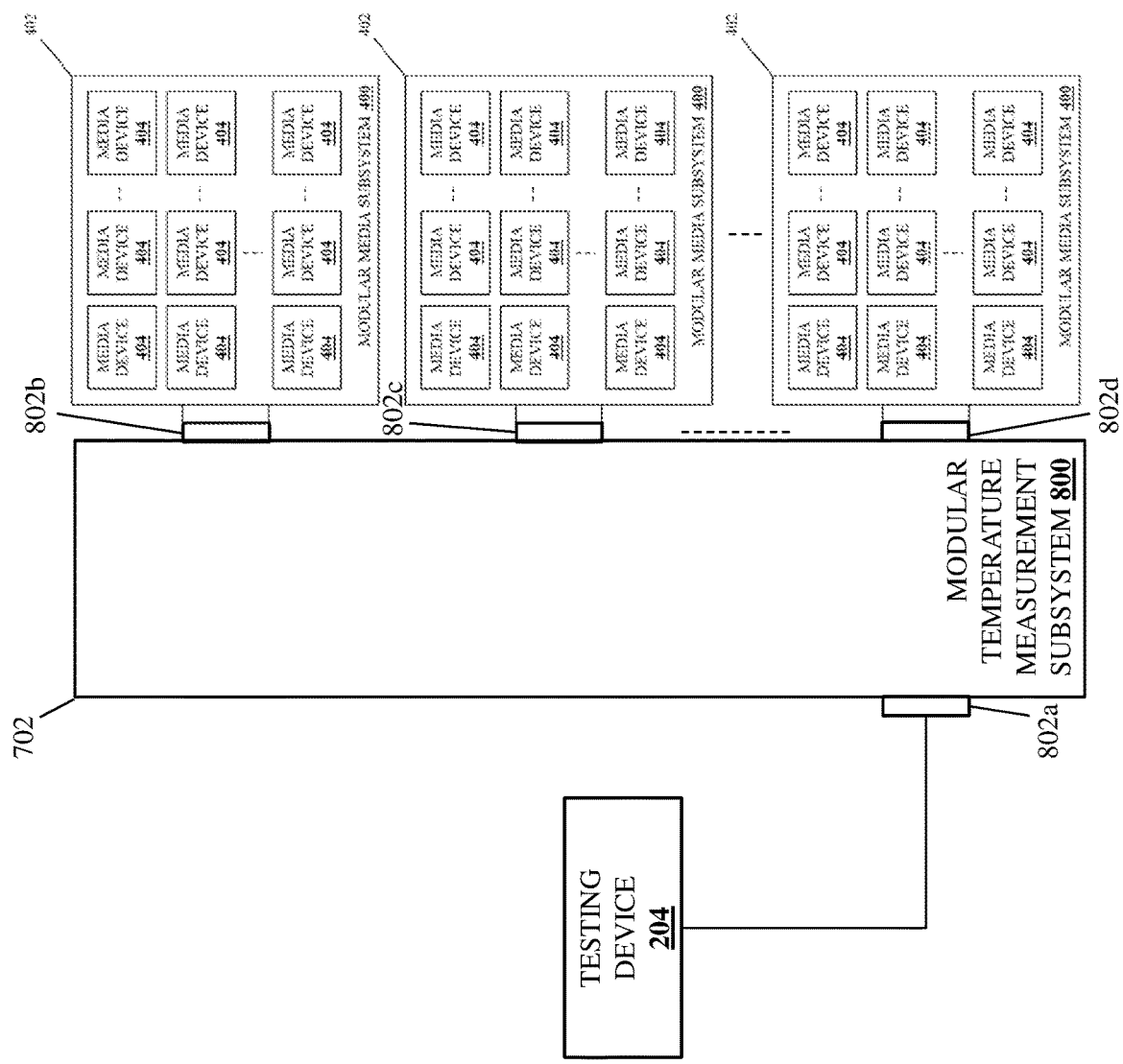
FIG. 16 is a schematic view illustrating an embodiment of the modular temperature measurement subsystem of FIG. 7 connected to a plurality of the modular media subsystem of FIG. 4 to provide the modular test system of FIG. 2.

With reference to FIG. 16, an embodiment of the use of the modular temperature measurement subsystem 800 discussed above with reference to FIG. 8 is illustrated. As can be seen, one of the testing device(s) 204 discussed above with reference to FIG. 2 may be coupled to the connector 802*a* on the modular temperature measurement subsystem 800 by, for example, connecting a cable between the testing device 204 and the connector 802*a* on the modular temperature measurement subsystem 800, directly connecting the connector 802*a* on the modular temperature measurement subsystem 800 to a corresponding connector on the testing device 204, and/or providing other couplings that would be apparent to one of skill in the art in possession of the present disclosure. Furthermore, a plurality of the modular media subsystems 400 may be coupled to the modular temperature measurement subsystem 800 by connecting the connector 406 on each respective modular media subsystem 400 to one of each of the connectors 802*b* and up to 802*d* on the modular temperature measurement subsystem 800.

In an embodiment, the modular temperature measurement subsystem 800 may be configured to receive temperature measurements (e.g., provided by temperature sensors included with the media devices 404 on the modular media subsystems 400) and provide those temperature measurements to the testing device 204. As will be appreciated by one of skill in the art in possession of the present disclosure, the temperature measurement functionality described above for the modular temperature measurement subsystem 800 may be performed as part of testing operations that occur without the need for the modular controller subsystem 300 or its functionality discussed above. For example, the modular temperature measurement subsystem 800 may not include a conventional controller or controller functionality, and instead may be provided by a "lightweight" circuit board that is configured to simply read the temperature sensors included with the media devices 404 on the modular media subsystems 400, and provide the temperature data obtained to the testing device 204. As such, the modular temperature measurement subsystem 800 may be provided in a temperature-controlled environment (e.g., a test chamber/"oven") and used to perform temperature testing on the modular media subsystem 400.

Thus, systems and methods have been described that provide a modular test system with modular intermediary subsystems that may be provided to couple a modular controller subsystem to a modular tested subsystem, with any of the modular intermediary subsystems configured to perform a testing function that is not available in the modular controller subsystem during testing operations. For example, the modular test system of the present disclosure may include a modular controller subsystem coupled to a modular tested subsystem by a modular intermediary subsystem. The modular intermediary subsystem transmits communications between the modular controller subsystem and the modular tested subsystem during testing operations performed by the modular controller subsystem, and performs at least one testing function that is not available in the modular controller subsystem during the testing operations performed by the modular controller subsystem. As such, the modular tested subsystem may have different usages and functions tested by interchanging different modular intermediary subsystems between the modular controller subsystem and that modular tested subsystem, and using those modular intermediary subsystems to perform testing functions that are not available in the modular controller subsystem that is performing those testing operations. In some embodiments, the modular intermediary subsystems of the present disclosure may be interchangeable in modular test systems in order to test NAND storage subsystems at "normal" maximum line rate conditions, provide full debug capability as needed, provide power measurement, and provide offline NAND storage subsystem temperature measurement, thus decoupling upgrade developmental pathways for controllers and NAND storage subsystems, and enabling both small and large scale NAND storage subsystem testing.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A modular test system, comprising:
 a modular tested subsystem that includes a plurality of NAND storage subsystems;
 a modular controller subsystem that is configured to connect directly to the modular tested subsystem and, while connected directly to the modular tested subsystem, to perform data transmission testing operations on one or more of the plurality of NAND storage subsystems included on the modular tested subsystem;
 a power measuring modular intermediary subsystem that is configured to connect the modular controller subsystem indirectly to the modular tested subsystem and, while connecting the modular controller subsystem indirectly to the modular tested subsystem, to:
  transmit power measurement testing communications between the modular controller subsystem and the one or more of the plurality of NAND storage subsystems included on the modular tested subsystem to cause the one or more of the plurality of NAND storage subsystems included on the modular tested subsystem to perform power measurement testing operations; and perform at least one power measurement testing function that is not available in the modular controller subsystem and that provides for measurement of power consumed by the one or more of the plurality of NAND storage subsystems included on the modular tested subsystem during the power measurement testing operations; and a debug data analyzing modular intermediary subsystem that is configured to connect the modular controller subsystem indirectly to the modular tested subsystem and, while connecting the modular controller subsystem indirectly to the modular tested subsystem, to:

transmit data debug analyzing communications between the modular controller subsystem and the modular tested subsystem to cause the one or more of the plurality of NAND storage subsystems included on the modular tested subsystem to perform debug data analyzing testing operations; and perform at least one debug data analyzing testing function that is not available in the modular controller subsystem and that provides for analysis of debug data generated by the one or more of the plurality of NAND storage subsystems included on the modular tested subsystem during the debug data analyzing testing operations.

2. The modular test system of claim 1, wherein the at least one power measurement testing function performed by the power measuring modular intermediary subsystem includes a power measurement function to measure the power consumed by the one or more of the plurality of NAND storage subsystems included on the modular tested subsystem during the power measurement testing operations performed by the one or more of the plurality of NAND storage subsystems included on the modular tested subsystem during the power measurement testing operations.

3. The modular test system of claim 1, wherein the at least one power measurement testing function performed by the power measuring modular intermediary subsystem includes a power measurement data routing function to route power consumption data generated by the one or more of the plurality of NAND storage subsystems included on the modular tested subsystem during the power measurement testing operations performed by the one or more of the plurality of NAND storage subsystems included on the modular tested subsystem during the power measurement testing operations to a testing device that is coupled to the power measuring modular intermediary subsystem.

4. The modular test system of claim 1, wherein the at least one debug data analyzing testing function performed by the debug data analyzing modular intermediary subsystem includes a debug data analyzing function to analyze the debug data generated by the one or more of the plurality of NAND storage subsystems included on the modular tested subsystem during the debug data analyzing testing operations performed by the one or more of the plurality of NAND storage subsystems included on the modular tested subsystem during the debug data analyzing testing operations.

5. The modular test system of claim 1, wherein the at least one debug data analyzing testing function performed by the debug data analyzing modular intermediary subsystem includes a debug data routing function to route the debug data generated by the one or more of the plurality of NAND storage subsystems included on the modular tested subsystem during the debug data analyzing testing operations performed by the one or more of the plurality of NAND storage subsystems included on the modular tested subsystem to a testing device that is coupled to the debug data analyzing modular intermediary subsystem.

6. The modular test system of claim 1, wherein the modular tested subsystem is a first modular tested subsystem that includes a plurality of first NAND storage subsystems, and wherein the modular test system further comprises:

an expansion modular intermediary subsystem that is configured to connect the modular controller subsystem indirectly to the first modular tested subsystem and to a second modular tested subsystem that includes a plurality of second NAND storage subsystems and, while connecting the modular controller subsystem indirectly to the first modular tested subsystem and the second modular tested subsystem, to:

transmit data transmission testing communications between the modular controller subsystem and one or more of the plurality of first NAND storage subsystems included on the first modular tested subsystem to cause the one or more of the plurality of first NAND storage subsystems included on the first modular tested subsystem to perform the data transmission testing operations; and transmit data transmission testing communications between the modular controller subsystem and one or more of the plurality of second NAND storage subsystems included on the second modular tested subsystem to cause the one or more of the plurality of second NAND storage subsystems included on the second modular tested subsystem to perform the data transmission testing operations.

7. A modular intermediary subsystem, comprising:

a power measuring modular intermediary board including:

a first power measuring modular intermediary connector that is configured to connect to a modular controller subsystem that is configured to be connected directly to a modular tested subsystem and, while connected directly to the modular tested subsystem, to perform data transmission testing operations on one or more of a plurality of NAND storage subsystems included on the modular tested subsystem;

a second power measuring modular intermediary connector that is configured to connect to the modular tested subsystem to indirectly connect the modular controller subsystem to the modular tested subsystem;

a first power measuring modular intermediary board subsystem that is configured to:

transmit power measurement testing communications between the modular controller subsystem and the one or more of the plurality of NAND storage subsystems included on the modular tested subsystem to cause the one or more of the plurality of NAND storage subsystems included on the modular tested subsystem to perform power measurement testing operations; and a second power measuring modular intermediary board subsystem that is configured to:

perform at least one power measurement testing function that is not available in the modular controller subsystem and that provides for measurement of power consumed by the one or more of the plurality of NAND storage subsystems included on the modular tested subsystem during the power measurement testing operations; and a debug data analyzing modular intermediary board including:
- a first debug data analyzing modular intermediary connector that is configured to connect to the modular controller subsystem;
- a second debug data analyzing modular intermediary connector that is configured to connect to the modular tested subsystem to indirectly connect the modular controller subsystem to the modular tested subsystem;
- a first debug data analyzing modular intermediary board subsystem that is configured to:
  transmit debug data analyzing testing communications between the modular controller subsystem and the one or more of the plurality of NAND storage subsystems included on the modular tested subsystem to cause the one or more of the plurality of NAND storage subsystems included on the modular tested subsystem to perform debug data analyzing testing operations; and
- a second debug data analyzing modular intermediary board subsystem that is configured to:
  perform at least one debug data analyzing testing function that is not available in the modular controller subsystem and that provides for analysis of debug data generated by the one or more of the plurality of NAND storage subsystems included on the modular tested subsystem during the debug data analyzing testing operations.

8. The modular intermediary subsystem of claim 7, wherein the at least one power measurement testing function performed by the second power measuring modular intermediary board subsystem includes a power measurement function to measure the power consumed by the one or more of the plurality of NAND storage subsystems included on the modular tested subsystem during the power measurement testing operations performed by the one or more of the plurality of NAND storage subsystems included on the modular tested subsystem during the power measurement testing operations.

9. The modular intermediary subsystem of claim 7, further comprising:
a third power measuring modular intermediary connector that is included on the power measuring modular intermediary board, wherein the at least one power measurement testing function performed by the second power measuring modular intermediary board subsystem includes a power measurement data routing function to route power consumption data generated by the one or more of the plurality of NAND storage subsystems included on the modular tested subsystem during the power measurement testing operations performed by the one or more of the plurality of NAND storage subsystems included on the modular tested subsystem during the power measurement testing operations to a testing device that is connected to the third power measuring modular intermediary connector.

10. The modular intermediary subsystem of claim 7, wherein the at least one debug data analyzing testing function performed by the second debug data analyzing modular intermediary board subsystem includes a debug data analyzing function to analyze the debug data generated by the one or more of the plurality of NAND storage subsystems included on the modular tested subsystem during the debug data analyzing testing operations performed by the one or more of the plurality of NAND storage subsystems included on the modular tested subsystem during the debug data analyzing testing operations.

11. The modular intermediary subsystem of claim 7, further comprising:
a third debug data analyzing modular intermediary connector that is included on the debug data analyzing modular intermediary board, wherein the at least one debug data analyzing testing function includes a debug data routing function to route the debug data generated by the one or more of the plurality of NAND storage subsystems included on the modular tested subsystem during the debug data analyzing testing operations performed by the one or more of the plurality of NAND storage subsystems included on the modular tested subsystem to a testing device that is connected to the third debug data analyzing modular intermediary connector.

12. The modular intermediary subsystem of claim 7, wherein the modular tested subsystem is a first modular tested subsystem including a plurality of first NAND storage subsystems, and wherein the modular intermediary subsystem further comprises:
an expansion modular intermediary board including:
- a first expansion modular intermediary connector that is configured to connect to the modular controller subsystem;
- a second expansion modular intermediary connector that is configured to connect to the first modular tested subsystem to indirectly connect the modular controller subsystem to the first modular tested subsystem;
- a third expansion modular intermediary connector that is configured to connect to a second modular tested subsystem including a plurality of second NAND storage subsystems to indirectly connect the modular controller subsystem to the second modular tested subsystem; and
- a data transmission modular intermediary board subsystem that is configured to:
  transmit data transmission testing communications between the modular controller subsystem and one or more of the plurality of first NAND storage subsystems included on the first modular tested subsystem to cause the one or more of the plurality of first NAND storage subsystems included on the first modular tested subsystem to perform the data transmission testing operations; and
  transmit data transmission testing communications between the modular controller subsystem and one or more of the plurality of second NAND storage subsystems included on the second modular tested subsystem to cause the one or more of the plurality of second NAND storage subsystems included on the second modular tested subsystem to perform the data transmission testing operations.

13. The modular intermediary subsystem of claim 7, wherein the modular controller subsystem is a first modular controller subsystem, and wherein the modular intermediary subsystem further comprises:
a multi-controller modular intermediary board including:
- a first multi-controller modular intermediary connector that is configured to connect to the first modular controller subsystem;

a second multi-controller modular intermediary connector that is configured to connect to a second modular controller subsystem;

a third multi-controller modular intermediary connector that is configured to connect to the modular tested subsystem to indirectly connect each of the first modular controller subsystem and the second modular controller subsystem to the modular tested subsystem; and a multi-controller modular intermediary board subsystem that is configured to:

transmit data transmission testing communications between the first modular controller subsystem and one or more of the plurality of NAND storage subsystems included on the modular tested subsystem to cause the one or more of the plurality of NAND storage subsystems included on the modular tested subsystem to perform the data transmission testing operations; and forward commands received from the second modular controller subsystem to the first modular controller subsystem.

14. A method for modular testing of a tested subsystem, comprising:

connecting, by a power measuring modular intermediary subsystem, to a modular controller subsystem that is configured to be connected directly to a modular tested subsystem and, while connected directly to the modular tested subsystem, to perform data transmission testing operations on one or more of a plurality of NAND storage subsystems included on the modular tested subsystem;

connecting, by the power measuring modular intermediary subsystem, to the modular tested subsystem to indirectly connect the modular controller subsystem to the modular tested subsystem;

transmitting, by the power measuring modular intermediary subsystem, power measurement testing communications between the modular controller subsystem and the one or more of the plurality of NAND storage subsystems included on the modular tested subsystem to cause the one or more of the plurality of NAND storage subsystems included on the modular tested subsystem to perform power measurement testing operations;

performing, by the power measuring modular intermediary subsystem, at least one power measurement testing function that is not available in the modular controller subsystem and that provides for measurement of power consumed by the one or more of the plurality of NAND storage subsystems included on the modular tested subsystem during the power measurement testing operations;

connecting, by a debug data analyzing modular intermediary subsystem, to the modular controller subsystem;

connecting, by the debug data analyzing modular intermediary subsystem, to the modular tested subsystem to indirectly connect the modular controller subsystem to the modular tested subsystem; and transmitting, by the debug data analyzing modular intermediary subsystem, debug data analyzing testing communications between the modular controller subsystem and the one or more of the plurality of NAND storage subsystems included on the modular tested subsystem to cause the one or more of the plurality of NAND storage subsystems included on the modular tested subsystem to perform debug data analyzing testing operations;

performing, by the debug data analyzing modular intermediary subsystem, at least one debug data analyzing testing function that is not available in the modular controller subsystem and that provides for analysis of debug data generated by the one or more of the plurality of NAND storage subsystems included on the modular tested subsystem during the debug data analyzing testing operations.

15. The method of claim 14, wherein performing the at least one power measurement testing function includes:

performing a power measurement function to measure the power consumed by the one or more of the plurality of NAND storage subsystems included on the modular tested subsystem during the power measurement testing operations performed by the one or more of the plurality of NAND storage subsystems included on the modular tested subsystem during the power measurement testing operations.

16. The method of claim 14, wherein performing the at least one power measurement testing function includes:

performing a power measurement data routing function to route power consumption data generated by the one or more of the plurality of NAND storage subsystems included on the modular tested subsystem during the power measurement testing operations performed by the one or more of the plurality of NAND storage subsystems included on the modular tested subsystem during the power measurement testing operations to a testing device that is connected to the power measuring modular intermediary subsystem.

17. The method of claim 14, wherein performing the at least one debug data analyzing testing function includes:

performing a debug data analyzing function to analyze the debug data generated by the one or more of the plurality of NAND storage subsystems included on the modular tested subsystem during the debug data analyzing testing operations performed by the one or more of the plurality of NAND storage subsystems included on the modular tested subsystem during the debug data analyzing testing operations.

18. The method of claim 14, wherein performing the at least one debug data analyzing testing function includes:

performing a debug data routing function to route the debug data generated by the one or more of the plurality of NAND storage subsystems included on the modular tested subsystem during the debug data analyzing testing operations performed by the one or more of the plurality of NAND storage subsystems included on the modular tested subsystem to a testing device that is connected to the debug data analyzing modular intermediary subsystem.

19. The method of claim 14, wherein the modular tested subsystem is a first modular tested subsystem including a plurality of first NAND storage subsystems, and wherein the method further comprises:

connecting, by an expansion modular intermediary subsystem, to the modular controller subsystem;

connecting, by the expansion modular intermediary subsystem, to the first modular tested subsystem to indirectly connect the modular controller subsystem to the first modular tested subsystem;

connecting, by the expansion modular intermediary subsystem, to a second modular tested subsystem that includes a plurality of second NAND storage subsystems to indirectly connect the modular controller subsystem to the second modular tested subsystem;

transmitting, by the expansion modular intermediary subsystem, data transmission testing communications between the modular controller subsystem and one or more of the plurality of first NAND storage subsystems included on the first modular tested subsystem to cause the one or more of the plurality of first NAND storage subsystems included on the first modular tested subsystem to perform the data transmission testing operations; and transmitting, by the expansion modular intermediary subsystem, data transmission testing communications between the modular controller subsystem and one or more of the plurality of second NAND storage subsystems included on the second modular tested subsystem to cause the one or more of the plurality of second NAND storage subsystems included on the second modular tested subsystem to perform the data transmission testing operations.

20. The method of claim 14, wherein the modular controller subsystem is a first modular controller subsystem and the method further comprises:

connecting, by a multi-controller modular intermediary subsystem, to the first modular controller subsystem;

connecting, by the multi-controller modular intermediary subsystem, to a second modular controller subsystem;

connecting, by the multi-controller modular intermediary subsystem, to the modular tested subsystem to indirectly connect each of the first modular controller subsystem and the second modular controller subsystem to the modular tested subsystem;

transmitting, by the multi-controller modular intermediary subsystem, data transmission testing communications between the first modular controller subsystem and the one or more of the plurality of NAND storage subsystems included on the modular tested subsystem to cause the one or more of the plurality of NAND storage subsystems included on the modular tested subsystem to perform the data transmission testing operations; and forwarding, by the multi-controller modular intermediary subsystem, commands received from the second modular controller subsystem to the first modular controller subsystem.

\* \* \* \* \*